US011882462B2

(12) United States Patent
Luo et al.

(10) Patent No.: US 11,882,462 B2
(45) Date of Patent: Jan. 23, 2024

(54) TRACKING REFERENCE SIGNAL TECHNIQUES IN WIRELESS COMMUNICATIONS

(71) Applicant: QUALCOMM Incorporated, San Diego, CA (US)

(72) Inventors: Tao Luo, San Diego, CA (US); Wooseok Nam, San Diego, CA (US); Sungwoo Park, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 17/169,290

(22) Filed: Feb. 5, 2021

(65) Prior Publication Data

US 2021/0250786 A1 Aug. 12, 2021

Related U.S. Application Data

(60) Provisional application No. 62/972,420, filed on Feb. 10, 2020.

(51) Int. Cl.
*H04W 24/02* (2009.01)
*H04B 17/318* (2015.01)

(52) U.S. Cl.
CPC .......... *H04W 24/02* (2013.01); *H04B 17/318* (2015.01)

(58) Field of Classification Search
CPC ....... H04W 24/02; H04B 17/318; H04L 5/035
See application file for complete search history.

(56) References Cited

U.S. PATENT DOCUMENTS

| 2013/0223251 A1* | 8/2013 | Li | H04B 7/0689 |
| | | | 370/252 |
| 2019/0246321 A1 | 8/2019 | Li et al. | |
| 2019/0296873 A1* | 9/2019 | Gupta | H04B 7/024 |

(Continued)

FOREIGN PATENT DOCUMENTS

| WO | WO-2013066416 A1 * | 5/2013 | ............... H04B 7/04 |
| WO | WO-2018203685 A1 * | 11/2018 | ............... H04L 5/00 |

(Continued)

OTHER PUBLICATIONS

Partial International Search Report—PCT/US2021/017096—ISA/EPO—dated May 25, 2021 (201048WO).

(Continued)

*Primary Examiner* — Jamal Javaid
*Assistant Examiner* — Ryan C Kavleski
(74) *Attorney, Agent, or Firm* — Arun Swain

(57) ABSTRACT

Methods, systems, and devices for wireless communications are described for joint communications among a UE and multiple transmission-reception points (TRPs) in which a subset of the multiple TRPs transmit periodic tracking reference signals (TRSs) for use in measurement and beam management at the UE and the multiple TRPs. The subset of TRPs may include TRPs having a relatively large contribution to signals received at the UE, and may transmit periodic (or semi-persistent) TRSs to be measured at the UE. One of the TRPs may provide configuration information to the UE of which TRPs are included in the subset of TRPs, or the UE may determine which TRPs are included in the subset of TRPs based on a signal quality of transmissions associated with each TRP.

46 Claims, 18 Drawing Sheets

(56) References Cited

U.S. PATENT DOCUMENTS

| | | | | |
|---|---|---|---|---|
| 2020/0187281 A1* | 6/2020 | Wang | .................... | H04W 24/02 |
| 2020/0366337 A1* | 11/2020 | Xie | ....................... | H04B 7/024 |
| 2021/0160923 A1* | 5/2021 | Zhang | ................... | H04L 1/1819 |

FOREIGN PATENT DOCUMENTS

| | | | | |
|---|---|---|---|---|
| WO | WO-2018203695-1 A | * | 11/2018 | ............... H04L 5/00 |
| WO | WO-2018203695 A1 | | 11/2018 | |

OTHER PUBLICATIONS

Qualcomm Incorporated: "Remaining Issues on TRS", 3GPP TSG RAN WG1 #90bis, 3GPP Draft; R1-1718550_TRS OPEN ISSUES, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 3, 2017 (Oct. 8, 2017), 9 Pages, Oct. 8, 2017 (Oct. 8, 2017), XP051353117, Retrieved from the Internet: URL: http://www.3gpp.org/ftp/tsg_ran/WG1_RL1/TSGR1_90b/Docs/ [retrieved on Oct. 3, 2017] Section 5 [retrieved on Oct. 8, 2017].

International Search Report and Written Opinion—PCT/US2021/017096—ISA/EPO—Jul. 16, 2021 (201048WO).

* cited by examiner

TRACKING REFERENCE SIGNAL TECHNIQUES IN WIRELESS COMMUNICATIONS

CROSS REFERENCE

The present Application for Patent claims the benefit of U.S. Provisional Patent Application No. 62/972,420 by LUO et al., entitled "TRACKING REFERENCE SIGNAL TECHNIQUES IN WIRELESS COMMUNICATIONS," filed Feb. 10, 2020, assigned to the assignee hereof, and expressly incorporated by reference herein.

FIELD OF TECHNOLOGY

The following relates generally to wireless communications and more specifically to tracking reference signal techniques in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support beamforming operations for directional communications. Beamforming, which may also be referred to as spatial filtering, directional transmission, or directional reception, may be a signal processing technique that may be used at a transmitting device or a receiving device to select, shape, or steer an antenna beam (for example, a transmit directional beam, a receive directional beam) along a spatial path between the transmitting device and the receiving device. Some wireless communications systems may support beamforming operations to mitigate pathloss and blockages with respect to the spatial path. As demand for communication efficiency increases, it may be desirable for a wireless communications system to target low latencies and improve reliability using beamforming operations.

SUMMARY

The described techniques relate to improved methods, systems, devices, and apparatuses that support tracking reference signal techniques in wireless communications. In some aspects, techniques are provided for nodes in a wireless communications system to establish joint communications in which a set of two or more transmission-reception points (TRPs) communicate with a user equipment (UE). The UE may measure one or more reference signals, such as tracking reference signals (TRSs), from a subset of the set of TRPs for use in management of joint communications parameters at the UE. In some cases, the subset of TRPs include TRPs having a relatively large contribution to signals received at the UE, and may transmit periodic or semi-persistent TRSs to be measured at the UE. In some cases, one of the TRPs may provide an indication to the UE of which TRPs are included in the subset of TRPs. In some cases, the UE may determine which TRPs are included in the subset of TRPs based on a signal quality of transmissions associated with each TRP (e.g., TRPs with a reference signal received power (RSRP) that meets or exceeds a threshold value). In some cases, one or more TRPs that are not included in the subset of TRPs may transmit aperiodic or periodic references signals to the UE.

A method of wireless communication at a UE is described. The method may include identifying a set of transmission-reception points that transmit joint communications to the UE, where each transmission-reception point of the set of transmission-reception points has a separate cell identification, determining a subset of the set of transmission-reception points that are to transmit periodic tracking reference signals, monitoring, based on the determining, for one or more tracking reference signals from the subset of transmission-reception points, and updating one or more joint communications parameters for joint communications with the set of transmission-reception points based on the one or more tracking reference signals from the subset of transmission-reception points.

An apparatus for wireless communication at a UE is described. The apparatus may include a processor, memory coupled with the processor, and instructions stored in the memory. The instructions may be executable by the processor to cause the apparatus to identify a set of transmission-reception points that transmit joint communications to the UE, where each transmission-reception point of the set of transmission-reception points has a separate cell identification, determine a subset of the set of transmission-reception points that are to transmit periodic tracking reference signals, monitor, based on the determining, for one or more tracking reference signals from the subset of transmission-reception points, and update one or more joint communications parameters for joint communications with the set of transmission-reception points based on the one or more tracking reference signals from the subset of transmission-reception points.

Another apparatus for wireless communication at a UE is described. The apparatus may include means for identifying a set of transmission-reception points that transmit joint communications to the UE, where each transmission-reception point of the set of transmission-reception points has a separate cell identification, determining a subset of the set of transmission-reception points that are to transmit periodic tracking reference signals, monitoring, based on the determining, for one or more tracking reference signals from the subset of transmission-reception points, and updating one or more joint communications parameters for joint communications with the set of transmission-reception points based on the one or more tracking reference signals from the subset of transmission-reception points.

A non-transitory computer-readable medium storing code for wireless communication at a UE is described. The code may include instructions executable by a processor to identify a set of transmission-reception points that transmit joint communications to the UE, where each transmission-reception point of the set of transmission-reception points has a separate cell identification, determine a subset of the set of transmission-reception points that are to transmit periodic tracking reference signals, monitor, based on the determining, for one or more tracking reference signals from the subset of transmission-reception points, and update one or more joint communications parameters for joint communications with the set of transmission-reception points based on the one or more tracking reference signals from the subset of transmission-reception points.

Some examples of the method, apparatuses, and non-transitory computer-readable medium described herein may further include operations, features, means, or instructions for receiving configuration information from at least a first transmission-reception point of the set of transmission-reception points that indicates the subset of transmission-reception points that are to transmit the periodic tracking reference signals, and where the determining is based on the configuration information. In some examples of the method, apparatuses, and non-transitory computer-readable medium described herein, the configuration information may be received in one or more of RRC signaling, a medium access control (MAC) control element, or DCI from at least the first transmission-reception point.

In some examples of the method, apparatuses, and non-transitory computer-readable medium described herein, the joint communications parameters include one or more of a transmit-receive beam pair, a timing error, or a frequency error. In some examples of the method, apparatuses, and non-transitory computer-readable medium described herein, the determining may include operations, features, means, or instructions for measuring a reference signal received power (RSRP) from each transmission-reception point of the set of transmission-reception points, and selecting a predetermined number of transmission-reception points from the set of transmission-reception points as the subset of transmission-reception points based on an ordering of the RSRP from each transmission-reception point.

In some examples of the method, apparatuses, and non-transitory computer-readable medium described herein, the determining further may include operations, features, means, or instructions for receiving configuration information from at least a first transmission-reception point that indicates one or more of the predetermined number of transmission-reception points that are to be selected as the subset of transmission-reception points, or a RSRP threshold value for selecting one or more TRPs whose RSRP is higher than or equal to the RSRP threshold value as the subset of transmission-reception points.

Some examples of the method, apparatuses, and non-transitory computer-readable medium described herein may further include operations, features, means, or instructions for transmitting a request to at least a first transmission-reception point to receive the periodic tracking reference signals from the subset of transmission-reception points. In some examples of the method, apparatuses, and non-transitory computer-readable medium described herein, the request may be transmitted to at least the first transmission-reception point in an uplink control information (UCI) transmission, a medium access control (MAC) control element, in a RRC signaling transmission, in a UE assistance information feedback transmission, or any combinations thereof.

In some examples of the method, apparatuses, and non-transitory computer-readable medium described herein, the subset of transmission-reception points is a first subset of transmission-reception points, and where a second subset of the set of transmission-reception points transmits one or more aperiodic tracking reference signals or periodic tracking reference signals, and where the second subset of transmission-reception points is non-overlapping with the first subset of transmission-reception points. Some examples of the method, apparatuses, and non-transitory computer-readable medium described herein may further include operations, features, means, or instructions for monitoring for one or more aperiodic tracking reference signals from one or more transmission-reception points of the second subset of transmission-reception points. In some examples of the method, apparatuses, and non-transitory computer-readable medium described herein, the monitoring for the one or more aperiodic tracking reference signals may include operations, features, means, or instructions for receiving a trigger that indicates to monitor for the one or more aperiodic tracking reference signals, where the trigger is received from the first transmission-reception point having a different cell identification than at least a second transmission-reception point that transmits the one or more aperiodic tracking reference signals.

In some examples of the method, apparatuses, and non-transitory computer-readable medium described herein, the trigger may be received in a layer-one signal from the first transmission-reception point that dynamically indicates that the second transmission-reception point may be to transmit the one or more aperiodic tracking reference signals. In some examples of the method, apparatuses, and non-transitory computer-readable medium described herein, a number of resource sets may be configured for a number of different aperiodic tracking reference signal configurations from different transmission-reception points, and where the trigger indicates an index value that is mapped to one of the number of resource sets. In some examples of the method, apparatuses, and non-transitory computer-readable medium described herein, at least one tracking reference signal resource set of the number of resource sets is associated with a group of two or more transmission-reception points.

In some examples of the method, apparatuses, and non-transitory computer-readable medium described herein, at least one of the one or more aperiodic tracking reference signals is a joint tracking reference signal that is transmitted by two or more transmission-reception points. In some examples of the method, apparatuses, and non-transitory computer-readable medium described herein, the two or more transmission-reception points that transmit the joint tracking reference signal have one or more common radio frequency components or a common oscillator. In some examples of the method, apparatuses, and non-transitory computer-readable medium described herein two or more joint tracking reference signals are transmitted by different groups of transmission-reception points, and where each different group of transmission-reception points is associated with a different cell identification.

A method of wireless communication at a first transmission-reception point is described. The method may include identifying a set of transmission-reception points that transmit joint communications to at least a first UE, where each transmission-reception point of the set of transmission-reception points has a separate cell identification, determining a subset of the set of transmission-reception points that are to transmit periodic tracking reference signals, and transmitting, based on the determining, configuration information to at least the first UE that indicates the subset of transmission-reception points that are to transmit the periodic tracking reference signals.

An apparatus for wireless communication at a first transmission-reception point is described. The apparatus may include a processor, memory coupled with the processor, and instructions stored in the memory. The instructions may be executable by the processor to cause the apparatus to identify a set of transmission-reception points that transmit joint communications to at least a first UE, where each transmission-reception point of the set of transmission-reception points has a separate cell identification, determine a subset of the set of transmission-reception points that are to transmit periodic tracking reference signals, and transmit, based on the determining, configuration information to at least the first UE that indicates the subset of transmission-reception points that are to transmit the periodic tracking reference signals.

Another apparatus for wireless communication at a first transmission-reception point is described. The apparatus may include means for identifying a set of transmission-reception points that transmit joint communications to at least a first UE, where each transmission-reception point of the set of transmission-reception points has a separate cell identification, determining a subset of the set of transmission-reception points that are to transmit periodic tracking reference signals, and transmitting, based on the determining, configuration information to at least the first UE that indicates the subset of transmission-reception points that are to transmit the periodic tracking reference signals.

A non-transitory computer-readable medium storing code for wireless communication at a first transmission-reception point is described. The code may include instructions executable by a processor to identify a set of transmission-reception points that transmit joint communications to at least a first UE, where each transmission-reception point of the set of transmission-reception points has a separate cell identification, determine a subset of the set of transmission-reception points that are to transmit periodic tracking reference signals, and transmit, based on the determining, configuration information to at least the first UE that indicates the subset of transmission-reception points that are to transmit the periodic tracking reference signals.

In some examples of the method, apparatuses, and non-transitory computer-readable medium described herein, the first transmission-reception point may be not included in the subset of transmission-reception points. In some examples of the method, apparatuses, and non-transitory computer-readable medium described herein, the configuration information may be transmitted in one or more of RRC signaling, a MAC-CE, or DCI to at least the first UE.

In some examples of the method, apparatuses, and non-transitory computer-readable medium described herein, the configuration information indicates that a predetermined number of the set of transmission-reception points are to be selected as the subset of transmission-reception points based on an ordering of a RSRP from each transmission-reception point of the set of transmission-reception points.

Some examples of the method, apparatuses, and non-transitory computer-readable medium described herein may further include operations, features, means, or instructions for receiving, from the first UE, a request to receive the periodic tracking reference signals from the subset of transmission-reception points. In some examples of the method, apparatuses, and non-transitory computer-readable medium described herein, the request may be transmitted to at least the first transmission-reception point in an uplink control information (UCI) transmission, a MAC-CE, in a RRC signaling transmission, in a UE assistance information feedback transmission, or any combinations thereof.

In some examples of the method, apparatuses, and non-transitory computer-readable medium described herein, the subset of transmission-reception points may be a first subset of transmission-reception points, and where a second subset of the set of transmission-reception points transmits one or more aperiodic tracking reference signals or periodic tracking reference signals, and where the second subset of transmission-reception points are non-overlapping with the first subset of transmission-reception points.

Some examples of the method, apparatuses, and non-transitory computer-readable medium described herein may further include operations, features, means, or instructions for transmitting a trigger to the first UE that indicates to monitor for the one or more aperiodic tracking reference signals, where the trigger indicates the first UE is to monitor for at least one aperiodic tracking reference signal from a second transmission-reception point having a different cell identification than the first transmission-reception point. In some examples of the method, apparatuses, and non-transitory computer-readable medium described herein, the trigger may be transmitted in a layer-one signal that dynamically indicates that the second transmission-reception point is to transmit the one or more aperiodic tracking reference signals.

In some examples of the method, apparatuses, and non-transitory computer-readable medium described herein, a number of resource sets may be configured at the first UE for a number of different aperiodic tracking reference signal configurations from a set of different transmission-reception points, and where the trigger indicates an index value that is mapped to one of the number of resource sets. In some examples of the method, apparatuses, and non-transitory computer-readable medium described herein, at least one tracking reference signal resource set of the number of resource sets is associated with a group of two or more transmission-reception points.

In some examples of the method, apparatuses, and non-transitory computer-readable medium described herein, at least one of the one or more aperiodic tracking reference signals is a joint tracking reference signal that is transmitted by two or more transmission-reception points. In some examples of the method, apparatuses, and non-transitory computer-readable medium described herein, the two or more transmission-reception points that transmit the joint tracking reference signal may have one or more common radio frequency components or a common oscillator. In some examples of the method, apparatuses, and non-transitory computer-readable medium described herein two or more joint tracking reference signals may be transmitted by different groups of transmission-reception points, and where each different group of transmission-reception points may be associated with a different cell ID.

DETAILED DESCRIPTION

Figure 1:
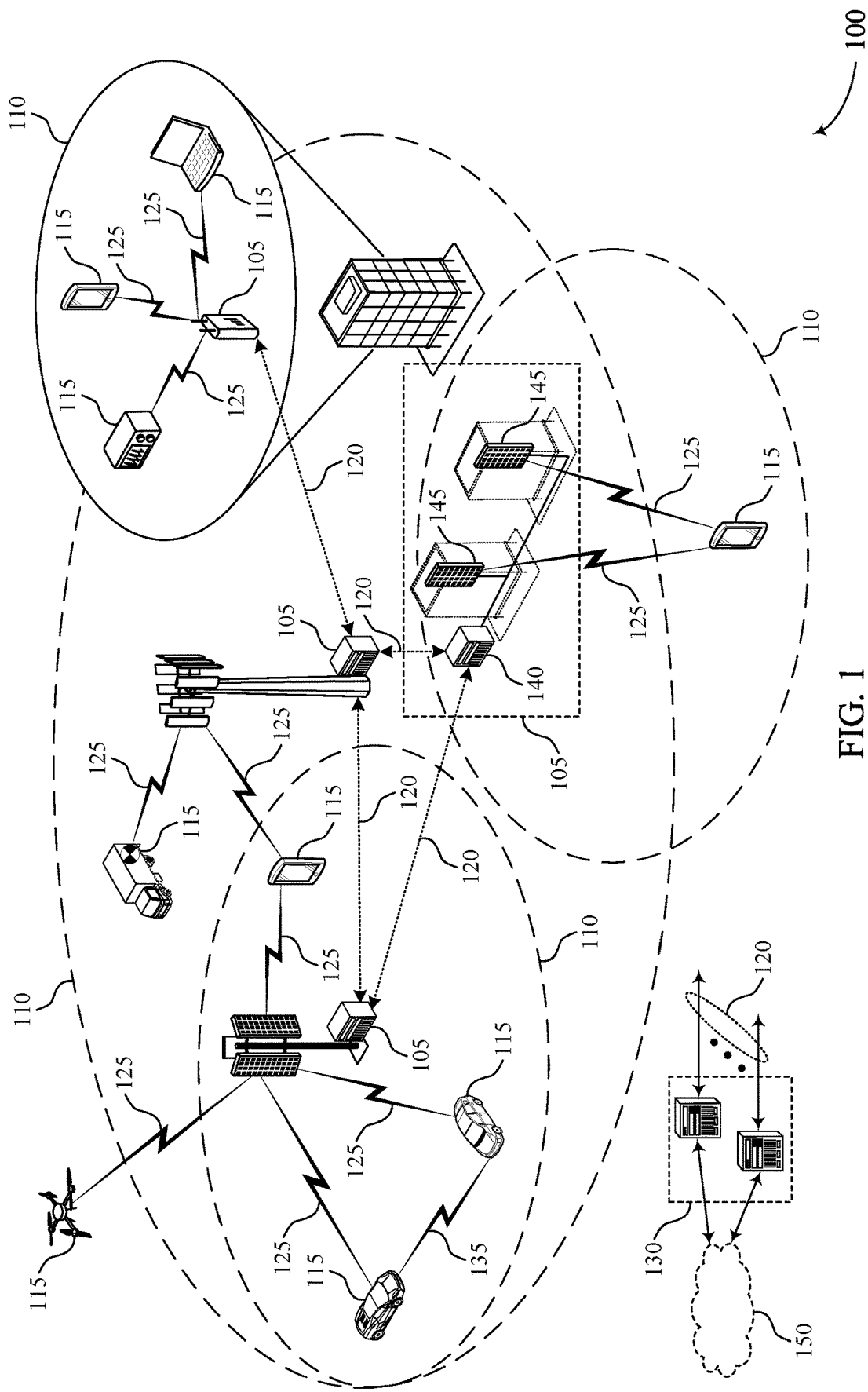
FIG. 1 illustrates an example of a system for wireless communications that supports tracking reference signal techniques in wireless communications in accordance with aspects of the present disclosure.

Some wireless communication systems may include communication devices, such as user equipments (UEs) and base stations (e.g., next-generation NodeBs or giga-NodeBs (which may be referred to as gNBs)), that may support multiple radio access technologies. Examples of radio access technologies include 4G systems such as Long Term Evolution (LTE) systems and fifth generation (5G) systems which may be referred to as New Radio (NR) systems. Some wireless communications systems, such as multiple-input multiple output (MIMO) systems, may configure the communication devices to support millimeter wave (mmW) communications (also referred to as directional communications). In some examples, the communication devices may experience one or more of a pathloss or a blockage with respect to a spatial path for the mmW communications. As a result, the communication devices may support beamforming operations to counter one or more of the pathloss or the blockage, among other examples. Further, in some cases, joint transmissions from two or more communication devices may be used to counter pathloss or blockage, in which multiple devices transmit or receive a signal from a UE. However, such beamformed communications may be relatively power intensive, and thus power-saving techniques that may be used in such communications are desirable in order to reduce power consumption.

According to various aspects of the present disclosure, techniques are provided for transmitting one or more reference signals, such as a tracking reference signal (TRS), in joint transmission operations from a subset of a set of transmission reception points (TRPs) that are used for joint communications. A UE may monitor for reference signal transmissions from the subset of TRPs and use measurements to determine one or more joint communications parameters, such as beamforming parameters, trimming error, frequency error, or any combinations thereof. For example, RSRP or signal-to-noise ratio (SNR) measurement parameters associated with the received TRSs may be used to determine a preferred transmit-receive beam pair or beam refinement for a transmit-receive beam pair (e.g., based on receive beamforming parameters that provide a highest or acceptable RSRP/SNR). Further, the UE may determine a timing error based on TRS measurements (e.g., based on a timing difference between an expected and measured starting time associated with a predetermined TRS sequence). In cases where frequency error is measured, the UE may determine the frequency error based on a measured difference between an expected and a measured reference signal frequency.

In some cases, a UE or other wireless node may establish joint communications in which a set of two or more TRPs communicate with the UE. The UE may measure one or more reference signals, such as TRSs, from a subset of the set of TRPs for use in management of joint communications parameters at the UE. In some cases, the subset of TRPs include TRPs having a relatively large contribution to signals received at the UE, and may transmit periodic or semi-persistent TRSs to be measured at the UE. In some cases, one of the TRPs may provide an indication to the UE of which TRPs are included in the subset of TRPs. In some cases, the UE may determine which TRPs are included in the subset of TRPs based on a signal quality of transmissions associated with each TRP (e.g., TRPs with a reference signal received power (RSRP) that meets or exceeds a threshold value). In some cases, one or more TRPs that are not included in the subset of TRPs may transmit aperiodic or periodic references signals to the UE.

Particular aspects of the subject matter described in this disclosure may be implemented to realize one or more of the following potential advantages. The techniques employed by the described communication devices may provide benefits and enhancements to the operation of the communication devices. For example, operations performed by the described communication devices may provide improvements to power consumption when performing beam operations. In some examples, configuring a subset of TRPs from a set of TRPs used for joint communications as described may support improvements to power consumption through monitoring of fewer reference signals at a UE, and, in some examples, may promote higher reliability for beamforming operations through measurements of TRPs having the largest contributions to jointly transmitted signals, among other benefits.

Aspects of the disclosure are initially described in the context of wireless communications systems. Examples of systems using joint transmissions are then discussed for various aspects. Aspects of the disclosure are further illustrated by and described with reference to process flows, apparatus diagrams, system diagrams, and flowcharts that relate to tracking reference signal techniques in wireless communications.

FIG. 1 illustrates an example of a wireless communications system 100 that supports tracking reference signal techniques in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer, or Layer 2, may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, or Layer 1, transport channels may be mapped to physical channels.

In some cases, a node in a wireless communications system, such as a UE 115, may use joint communications in which a set of two or more transmission-reception points (TRPs) communicate with the UE (e.g., two or more TRPs at a same or different base station 105). The UE 115 may identify a subset of the TRPs that perform joint communications and may measure one or more reference signals, such as TRSs, from the subset of TRPs. The reference signal measurements may be used, for example, in management of joint communications parameters at the UE 115 (e.g., beam management, time error tracking, frequency error tracking, or any combinations thereof). In some cases, the subset of TRPs include TRPs having a relatively large contribution to signals received at the UE 115, and may transmit periodic or semi-persistent TRSs to be measured at the UE 115. In some cases, a base station 105 may provide an indication to the UE 115 of which TRPs are included in the subset of TRPs. In some cases, the UE 115 may determine which TRPs are included in the subset of TRPs based on a signal quality of transmissions associated with each TRP (e.g., TRPs with a RSRP that meets or exceeds a threshold value). In some cases, one or more TRPs that are not included in the subset of TRPs may transmit aperiodic or periodic references signals to the UE 115.

Figure 2:
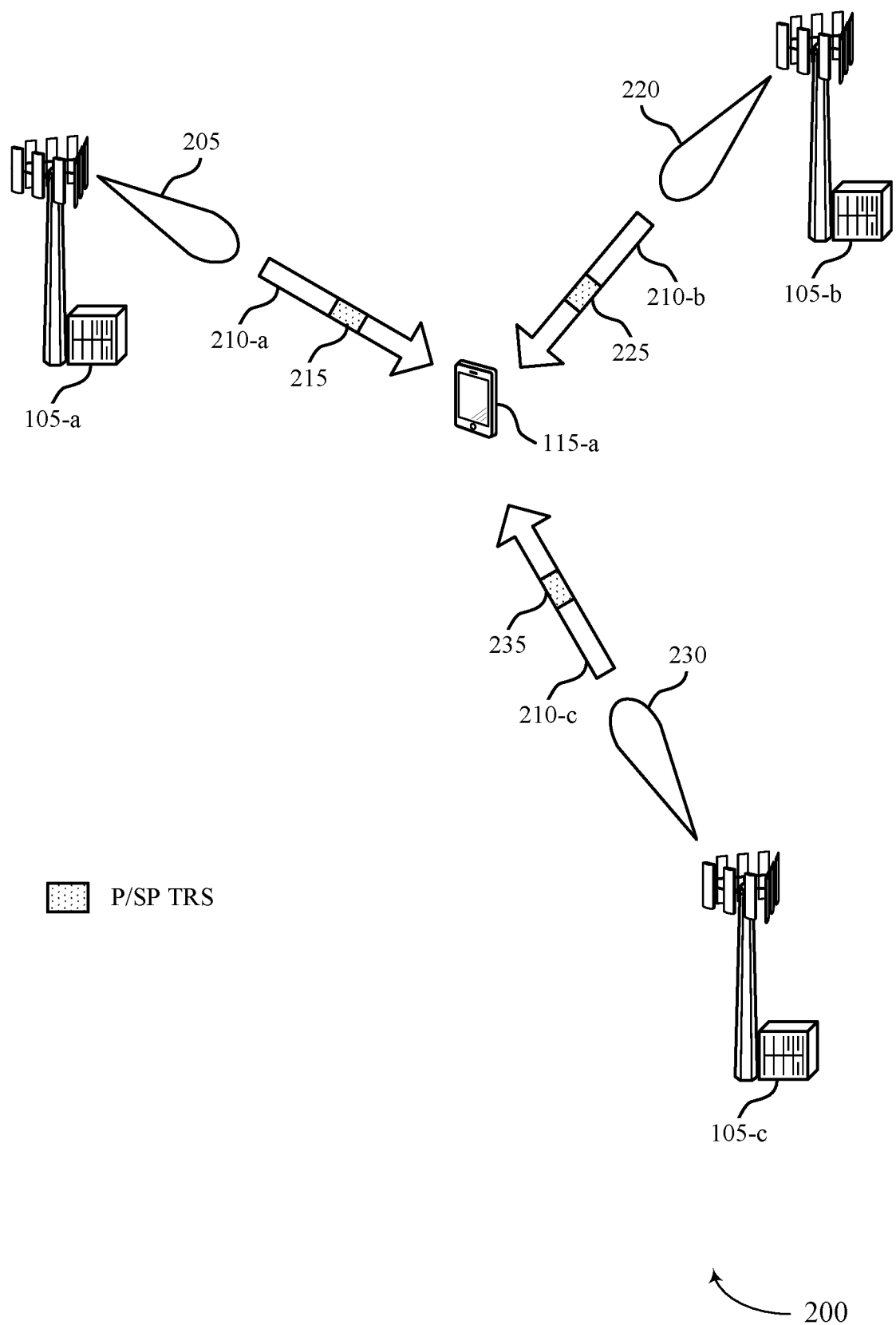
FIG. 2 illustrates an example of a portion of a wireless communications system that supports tracking reference signal techniques in wireless communications in accordance with aspects of the present disclosure.

FIG. 2 illustrates an example of a wireless communications system 200 that supports tracking reference signal techniques in wireless communications in accordance with aspects of the present disclosure. In some examples, wireless communications system 200 may implement aspects of wireless communications system 100. In some examples, the wireless communications system 200 may include a UE 115-*a* and a number of base stations 105, including a first base station 105-*a*, a second base station 105-*b*, and a third base station 105-*c*, which may be examples of UEs 115 and base stations 105 described with reference to FIG. 1. Base stations 105 in this example may be examples of TRPs as discussed herein.

In this example, the UE 115-*a* and the base stations 105 perform joint communications in which downlink transmissions 210 may be transmitted concurrently by each base station 105 and received at the UE 115-*a*. In some cases, the base stations 105 may act as a single frequency network (SFN) for downlink shared channel transmissions (e.g., physical downlink shared channel (PDSCH) transmissions), for downlink control channel transmissions (e.g., physical downlink control channel (PDCCH) transmissions), and/or other channels, for example, and the UE 115-*a* may decode one or more channels included in the downlink transmissions 210 in a same decoding operation. In this example, the base stations 105 and UE 115-*a* may communicate using beamformed communications, in which the UE 115-*a* uses a receive beam for receiving downlink transmissions 210 and each base station 105 uses a transmission beam that is quasi co-located (QCL) with the receive beam. In the example of FIG. 2, the first base station 105-*a* transmits a downlink transmission 210-*a* using first transmit beam 205, the second base station 105-*b* transmits a downlink transmission 210-*b* using second transmit beam 220, and the third base station 105-*c* transmits downlink transmission 210-*c* using third transmission beam 230.

The UE 115-*a* may monitor for various reference signals transmitted by each base station 105. Such reference signals may include, for example, a TRS, which may be used for multiple purposes such as timing and/or frequency error tracking, as a QCL reference signal for other channels or signals, or any combinations thereof. In some cases, each base station 105 (or TRP) may have a different cell ID, and jointly serve the UE 115-*a*, and the base stations 105 may transmit joint or separate TRSs for the UE 115-*a*. In some cases, such as a single-frequency network (SFN) case, the multiple base stations 105 may transmit the same TRS to the UE 115-*a* simultaneously, and thus the UE 115-*a* sees a combined TRS. In other cases, such as illustrated in the example of FIG. 2, different base stations 105 may each transmit a separate TRS to the UE 115-*a* (e.g., in a TDM manner), and the UE may measure TRS from each base station 105 separately. In this example, the first base station 105-*a* may transmit a first TRS 215, the second base station 105-*b* may transmit a second TRS 225, and the third base station 105-*c* may transmit a third TRS 235. According to aspects as discussed herein, the UE 115-*a* may monitor a subset of the base stations 105 for various beam tracking or beam management procedures. For example, the UE 115-*a* may monitor only the first base station 105-*a* for the first TRS 215 and perform timing and/or frequency error measurements based on the first TRS 215, or may monitor two or more but less than all of the base stations 105 for TRS measurements. Such scenarios may provide for enhanced measurements (e.g., timing/frequency error measurements or QCL reference signal measurements) for one or more channels or signals that are transmitted by only the monitored base stations 105, for example.

In some aspects, the UE 115-*a* may monitor a subset of base stations 105 for periodic or semi-persistent TRS (P/SP-TRS) transmissions. In some cases, the UE 115-*a* may be configured with a subset of one or more designated base stations 105 or TRPs among the base stations 105 or TRPs that are serving the UE 115-*a*. In some cases, the designated base stations 105 may be determined based on which have relatively contributions among all of the serving base stations 105 to the received signals at the UE 115-*a*. In some cases, the subset of base stations 105 can be explicitly configured for the UE 115-*a* (e.g., by higher layer signaling such as a medium access control (MAC) control element (CE), in downlink control information (DCI), or in radio resource control (RRC) signaling). In some cases, the subset of base stations 105 may be implicitly determined based on a measurement report of the UE 115-*a*. For example, the N serving base stations 105 with the best cell-level RSRP may be selected as the subset of base stations 105. In some cases, the value of N may be configured at the UE 115-*a*, or may be a pre-specified value. In other cases, the value of N may be based on a number of base stations 105 that have a reference signal received power (RSRP) that exceeds a threshold value, where the threshold value may be configured at the UE 115-*a* or may be a pre-specified value. Based on the determined subset of base stations 105 to be monitored, the UE 115-*a* may use the associated P/SP TRS resources to measure associated TRSs and track transmit/ receive beam beams and estimate time and frequency error. In some cases, base stations 105 that are not included in the determined subset of base stations 105 may transmit aperiodic TRS (A-TRS), or may also transmit P/SP-TRS. An example of different subsets of base stations 105 or TRPs that transmit P/SP-TRS and A-TRS is illustrated in FIG. 3.

Figure 3:
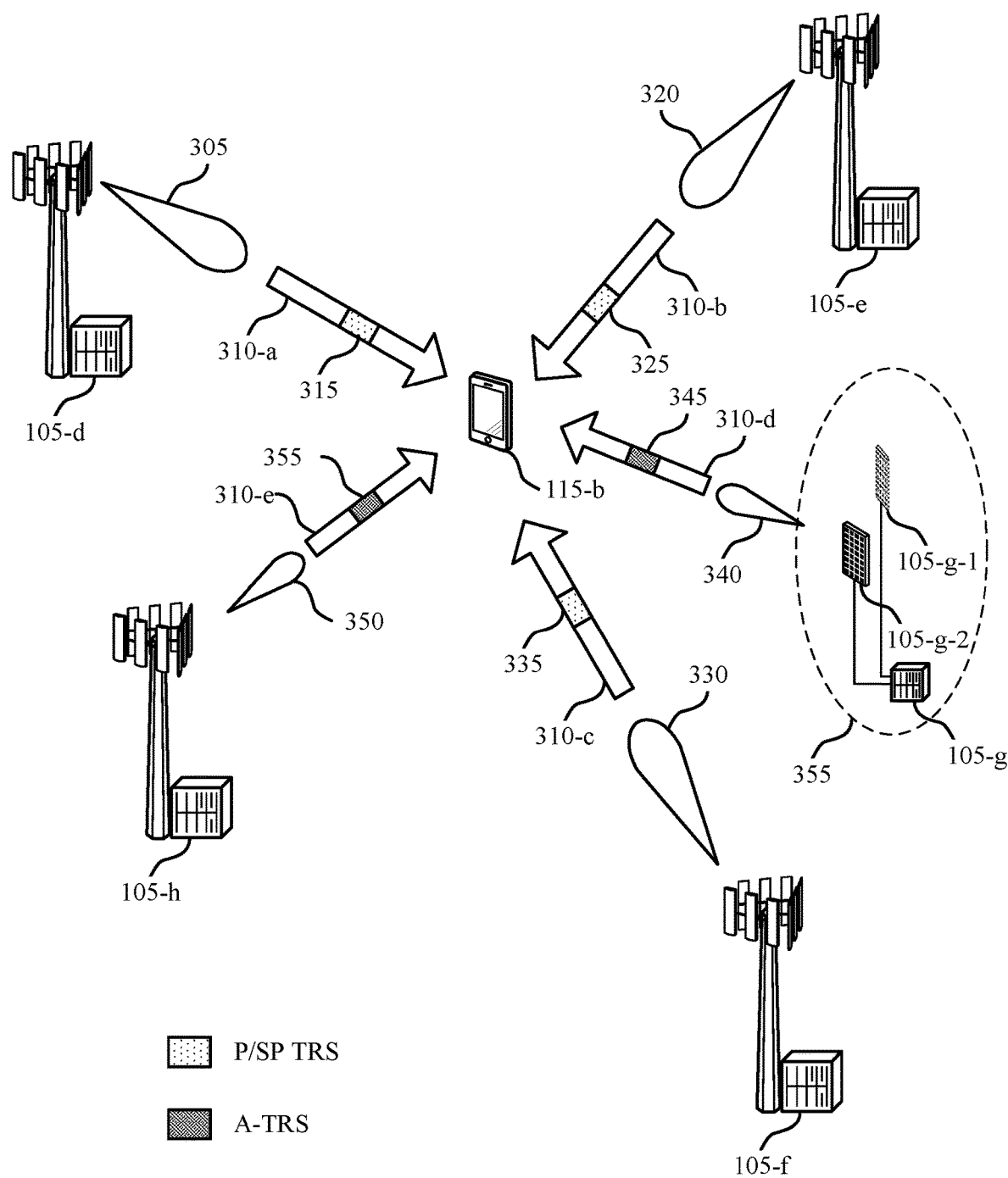
FIG. 3 illustrates another example of a portion of a wireless communications system that supports tracking reference signal techniques in wireless communications in accordance with aspects of the present disclosure.

FIG. 3 illustrates an example of a wireless communications system 300 that supports tracking reference signal techniques in wireless communications in accordance with aspects of the present disclosure. In some examples, wireless communications system 300 may implement aspects of wireless communications system 100 or 200. In some examples, the wireless communications system 200 may include a UE 115-b and a number of base stations 105, including a first base station 105-d, a second base station 105-e, a third base station 105-f, a fourth base station 105-g and a fifth base station 105-h, which may be examples of UEs 115 and base stations 105 described with reference to FIG. 1. Base stations 105 in this example may be examples of TRPs or include one or more TRPs as discussed herein.

In this example, the UE 115-b and the base stations 105 perform joint communications in which downlink transmissions 310 may be transmitted concurrently by each base station 105 and received at the UE 115-b. In this example, similarly as in the example of FIG. 2, the base stations 105 and UE 115-b may communicate using beamformed communications, in which the UE 115-b uses a receive beam for receiving downlink transmissions 310 and each base station 105 uses a transmission beam that is QCL with the receive beam. In the example of FIG. 3, the first base station 105-d transmits a downlink transmission 310-a using first transmit beam 305, the second base station 105-e transmits a downlink transmission 310-b using second transmit beam 320, the third base station 105-f transmits downlink transmission 310-c using third transmission beam 330, the fourth base station 105-g transmits downlink transmission 310-d using fourth transmission beam 340, and the fifth base station 105-h transmits downlink transmission 310-e using fifth transmission beam 350. In this example, the fourth base station 105-g may include two TRPs (e.g., two RRHs) that include a first TRP 105-g-1 and a second TRP 105-g-2 that are used for communications with the UE 115-b.

The UE 115-b may monitor for various reference signals transmitted by each base station 105, such as TRS transmissions. In this example, each base station 105 may have a different cell ID, and jointly serve the UE 115-b, and different base stations 105 may each transmit a separate TRS to the UE 115-b (e.g., in a TDM manner), and the UE may measure TRS from each base station 105 separately. In this example, the first base station 105-d may transmit a first TRS 315, the second base station 105-e may transmit a second TRS 325, the third base station 105-f may transmit a third TRS 335, and the fifth base station 105-h may transmit a fifth TRS 355. In this example, the first TRP 105-g-1 and second TRP 105-g-2 of the fourth base station 105-g may jointly transmit a fourth TRS 345 via joint fourth transmission beam 340, and be assigned a single cell ID. In other cases, different TRPs of a base station 105 may have different cell IDs.

According to aspects as discussed herein, the UE 115-b may monitor a first subset of the base stations 105 for P/SP-TRS transmission for various beam tracking or beam management procedures. In this example, the UE 115-b may monitor the first base station 105-d for the first TRS 315, the second base station 105-e for the second TRS, and the third base station 105-f for the third TRS 335, and perform timing and/or frequency error measurements based on the monitored reference signals of the first subset of base stations 105. Further, in this example, a second subset of base stations may include the fourth base station 105-g and fifth base station 105-h, which may transmit A-TRSs as the fourth TRS 345 and fifth TRS 355, respectively.

As discussed with reference to FIG. 2, in some cases the UE 115-b may be configured with the first subset of one or more designated base stations 105. In some cases, the designated base stations 105 may be determined based on which have relatively large contributions among all of the serving base stations 105 to the received signals at the UE 115-b. In some cases, the first subset of base stations 105 can be explicitly configured for the UE 115-b (e.g., by higher layer signaling such as a MAC-CE, in DCI, or in RRC signaling). In some cases, the first subset of base stations 105 may be implicitly determined based on a measurement report of the UE 115-b (e.g., the N serving base stations 105 with the best cell-level RSRP may be selected as the first subset as discussed herein).

In this example, each of the base stations 105 in the second subset of base stations may transmit a A-TRS. The UE 115-b may monitor for the A-TRS based on a trigger that is received at the UE 115-b. In some cases, a Layer-1 signal-based trigger for A-TRS may be used for TRPs with different cell IDs. For example, for serving TRPs outside the first subset, only A-TRS can be used instead of P/SP-TRS. In some cases, the UE 115-b may be signaled to indicate a shared TRS among a group of (one or more) TRPs, where those TRPs may share the same RF/oscillator, such as first TRP 105-g-1 and second TRP 105-g-2 in the example of FIG. 3.

In some cases, the Layer-1 signal that triggers aperiodic TRS can be transmitted from a single or a subset of TRPs or base stations 105, which may be different from the TRPs or base stations 105 that actually transmit the TRS. In such cases, the Layer-1 signal may dynamically indicate A-TRS from TRPs with different cell IDs. For example, multiple resource sets for A-TRS can be configured for a UE, and the Layer-1 triggering signal may indicate a resource set index associated with the A-TRS. In some cases, each TRS resource in a resource set can be associated with a group of one or more TRPs (e.g., TRPs sharing the same RF components), and each group of TRP(s) are associated with different cell IDs. The Layer-1 signal in such cases may indicate an index among the configured resources.

In some cases, the UE 115-b may request TRS periodicity for a specific TRP or a subset of TRPs such as the first subset of base stations in the example of FIG. 3. Such a request may be transmitted through an uplink control channel (e.g., UCI in PUCCH), through a MAC-CE, or a combination of Layer-1 signaling and MAC-CE, for example. In some cases, RRC or UE assistance information feedback from UE 115-b may be used to provide the request from the UE 115-b.

Figure 4:
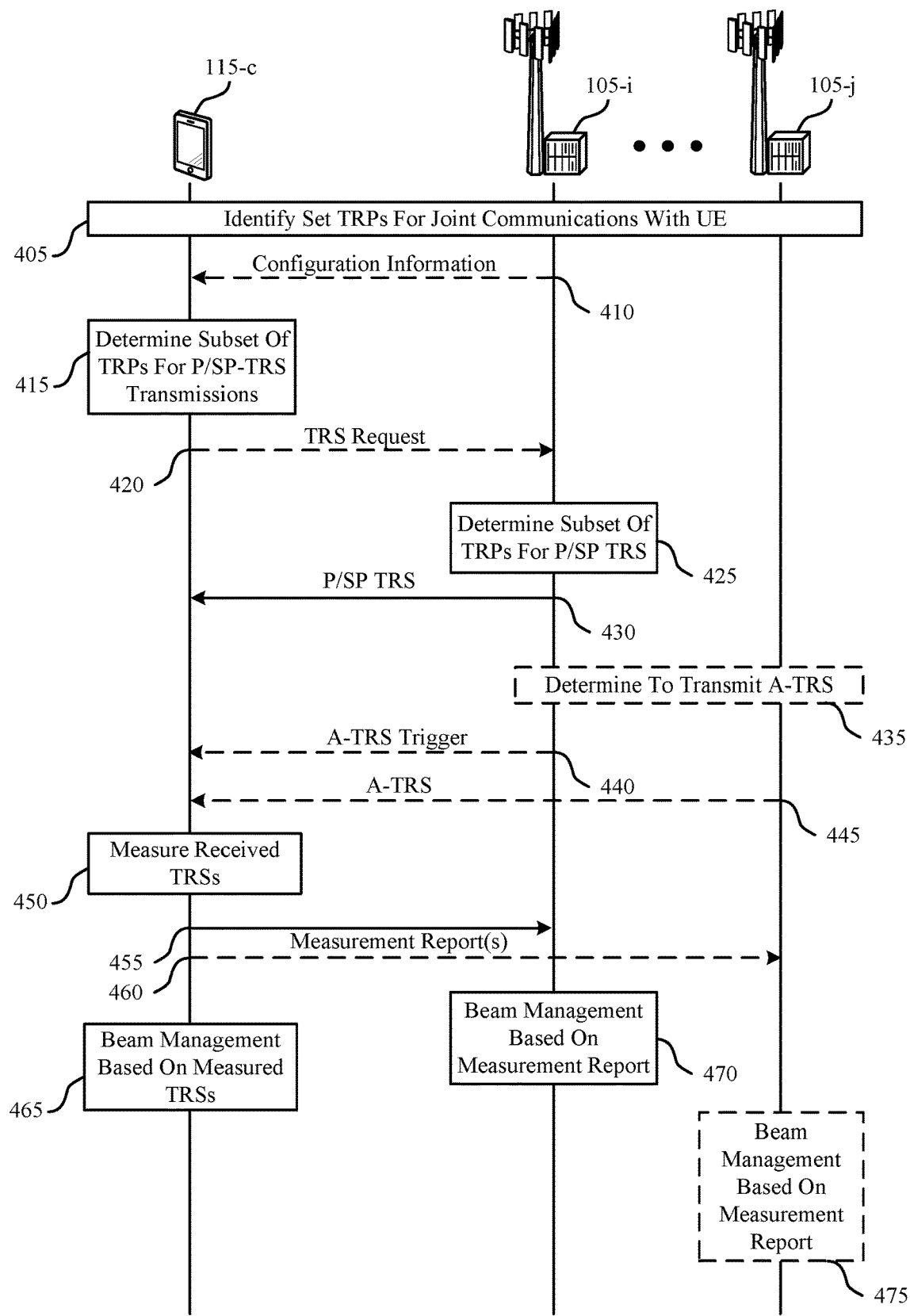
FIG. 4 illustrates an example of a process flow that supports tracking reference signal techniques in wireless communications in accordance with aspects of the present disclosure.

FIG. 4 illustrates an example of a process flow 400 that supports tracking reference signal techniques in wireless communications in accordance with aspects of the present disclosure. In some examples, process flow 400 may implement aspects of wireless communications system 100, 200, or 300. For example, the process flow 400 may be based on a configuration by a base station 105 or a UE 115, and implemented for enhanced measurements at a UE which may provide reduced power consumption (through reduced retransmissions and decoding iterations), enhanced spectral efficiency, higher data rates and, may promote higher reliability for beamforming operations, among other benefits.

The process flow 400 may include a first base station 105-i and a second base station 105-j, which may examples of TRPs as discussed herein, and a UE 115-c, which may be an example of a UE or communication node as discussed herein. The base stations 105 and UE 115-c also may be examples of base stations 105 and UEs 115 as described with reference to FIGS. 1 through 3. In the following description of the process flow 400, the communications between the base stations 105 and the UE 115-c may be transmitted in a different order than the example order shown, or the operations performed by the base stations 105 and the UE 115-c may be performed in different orders or at different times. Some operations may also be omitted from the process flow 400, and other operations may be added to the process flow 400. Further, while this example illustrates the base stations 105 transmitting and the UE 115-c receiving TRSs, techniques such as discussed herein may be used in cases where other devices may transmit or receive TRSs in accordance with techniques as discussed herein.

At 405, the UE 115-c and base stations 105 identify a set of TRPs for joint communications with the UE 115-c. In some cases, the UE 115-c and base stations 105 may perform a beam training procedure in order to establish one or more beams for use in beamformed communications. In some cases, each of the first base station 105-i and second base station 105-j may perform joint communications with the UE 115-c. Further, each of the first base station 105-i and the second base station 105-j may have different cell IDs.

Optionally, at 410, the first base station 105-i may transmit configuration information to the UE 115-c. The configuration information may include, for example, information related to a subset of base stations or TRPs that are to be monitored for periodic TRS transmissions. In other cases, the configuration information may include an indication of a number of TRPs that are to be monitored for P/SP-TRS transmissions.

At 415, the UE 115-c may determine a subset of base stations 105 or TRPs for P/SP-TRS transmissions. In some cases, the subset of base stations 105 or TRPs may be determined based on configuration information received from the first base station 105-i. In other cases, the determination of the subset of TRPs may be based on one or more reference signal measurements performed at the UE 115-c. In some cases, the UE 115-c may be configured with a number (N) of TRPs that are to be monitored in the subset of TRPs. Additionally or alternatively, the UE 115-c may be configured with a threshold value of an RSRP, where TRPs having an RSRP at or above the threshold are included in the subset of TRPs and TRPs having an RSRP below the threshold are not included in the subset of TRPs. In some cases, the UE 115-c may identify one or more TRPs having an RSRP that meets or exceeds. The RSRP threshold, and the UE 115-c may request periodic or semi-periodic TRS from the one or more identified TRPs. Optionally, at 420, the UE can transmit a TRS request to the first base station 105-i, that indicates the one or more identified TRPs.

At 425, the first base station 105-i may determine a subset of TRPs for periodic or semi-periodic TRS transmissions. At 430, the first base station 105-i may transmit a periodic or semi-periodic TRS to the UE 115-c. In some cases, the first base station 105-i may determine the subset of TRPs based on the TRS request received from the UE 115-c. In other cases, the first base station 105-i may determine the subset of TRPs based on one or more measurements received from the UE 115-c, and the subset of TRPs may be based on TRPs having the best channel conditions at the UE.

At 435, the first base station 105-i and the second base station 105-j may determine to transmit an aperiodic TRS. In some cases, the determination to transmit the aperiodic TRS may be based on one or more trigger conditions such as an amount of time since a prior aperiodic TRS, a change in one or more measured values at the UE, and the like. In this example, the first base station 105-i may optionally, at 440, transmit an aperiodic TRS trigger signal to the UE 115-c. Following such an aperiodic TRS trigger, the second base station 105-j, at 445, may transmit the aperiodic TRS to the UE 115-c. The UE may receive the aperiodic TRS trigger and monitor for the aperiodic TRS transmission in resources that are associated with the aperiodic TRS trigger.

At 450, the UE may measure one or more received TRS is that are transmitted by the one or more TRPs. In some cases, the UE may measure the periodic or semi-periodic TRSs transmitted from TRPs of the identified subset of TRPs (e.g., from the first base station 105-i). Further, the UE may measure one or more aperiodic TRS transmissions from one or more TRPs outside of the identified subset of TRPs (e.g., from the second base station 105-j). The UE 115-c, at 455, may transmit a measurement report to the first base station 105-i. Optionally at 460, the UE 115-c may transmit a measurement report associated with the aperiodic TRS to the second base station 105-j, or to the first base station 105-i along with a measurement report of the periodic TRSs.

At 465, the UE 115-c may perform beam management procedures based on the measured TRSs (e.g., time and/or frequency error tracking). Likewise at 470, the first base station 105-i may perform beam management based on the measurement report received from the UE 115-c (e.g., beam refinement or power control based on the measurement report). Optionally at 475, the second base station 105-j may perform beam management based on a measurement report received from the UE 115-c or the first base station 105-i that is associated with the aperiodic TRS.

Figure 5:
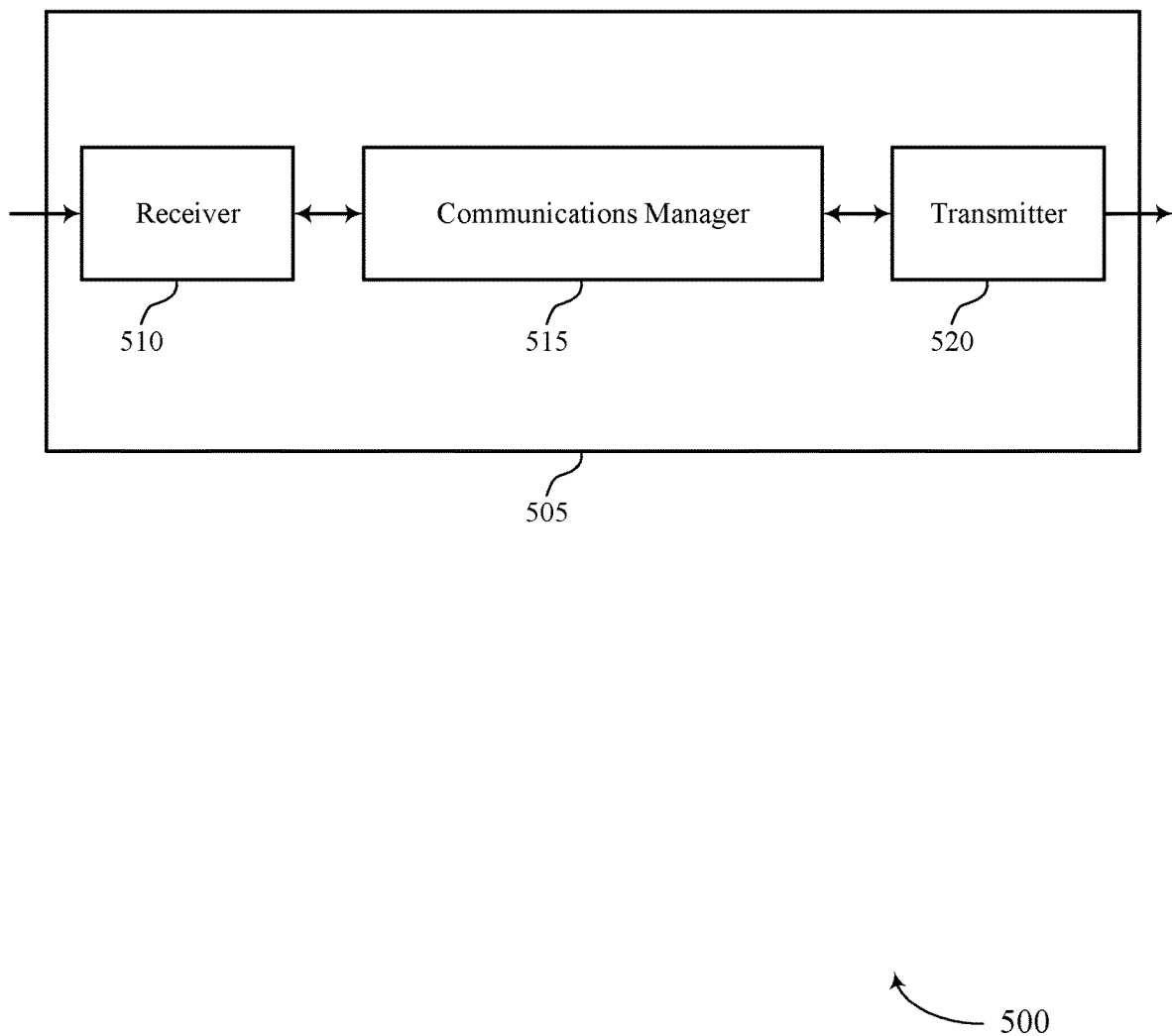
FIGS. 5 and 6 show block diagrams of devices that support tracking reference signal techniques in wireless communications in accordance with aspects of the present disclosure.

FIG. 5 shows a block diagram 500 of a device 505 that supports TRS techniques in wireless communications in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to TRS techniques in wireless communications, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a set of TRPs that transmit joint communications to the UE, where each TRP of the set of TRPs has a separate cell identification, determine a subset of the set of TRPs that are to transmit periodic TRSs, monitor, based on the determining, for one or more TRSs from the subset of TRPs, and update one or more joint communications parameters for joint communications with the set of TRPs based on the one or more TRSs from the subset of TRPs. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 515 as described herein may be implemented to realize one or more potential advantages. For example, operations performed by communications manager 515 may provide improvements to power consumption when performing beam operations. In some examples, configuring a subset of TRPs from a set of TRPs used for joint communications as described may support improvements to power consumption through monitoring of fewer reference signals at a UE, and, in some examples, may promote higher reliability for beamforming operations through measurements of TRPs having the largest contributions to jointly transmitted signals, among other benefits.

The transmitter 520 may transmit signals generated by other components of the device 505. In some examples, the transmitter 520 may be collocated with a receiver 510 in a transceiver. For example, the transmitter 520 may be an example of aspects of the transceiver 820 described with reference to FIG. 8. The transmitter 520 may utilize a single antenna or a set of antennas.

Figure 6:
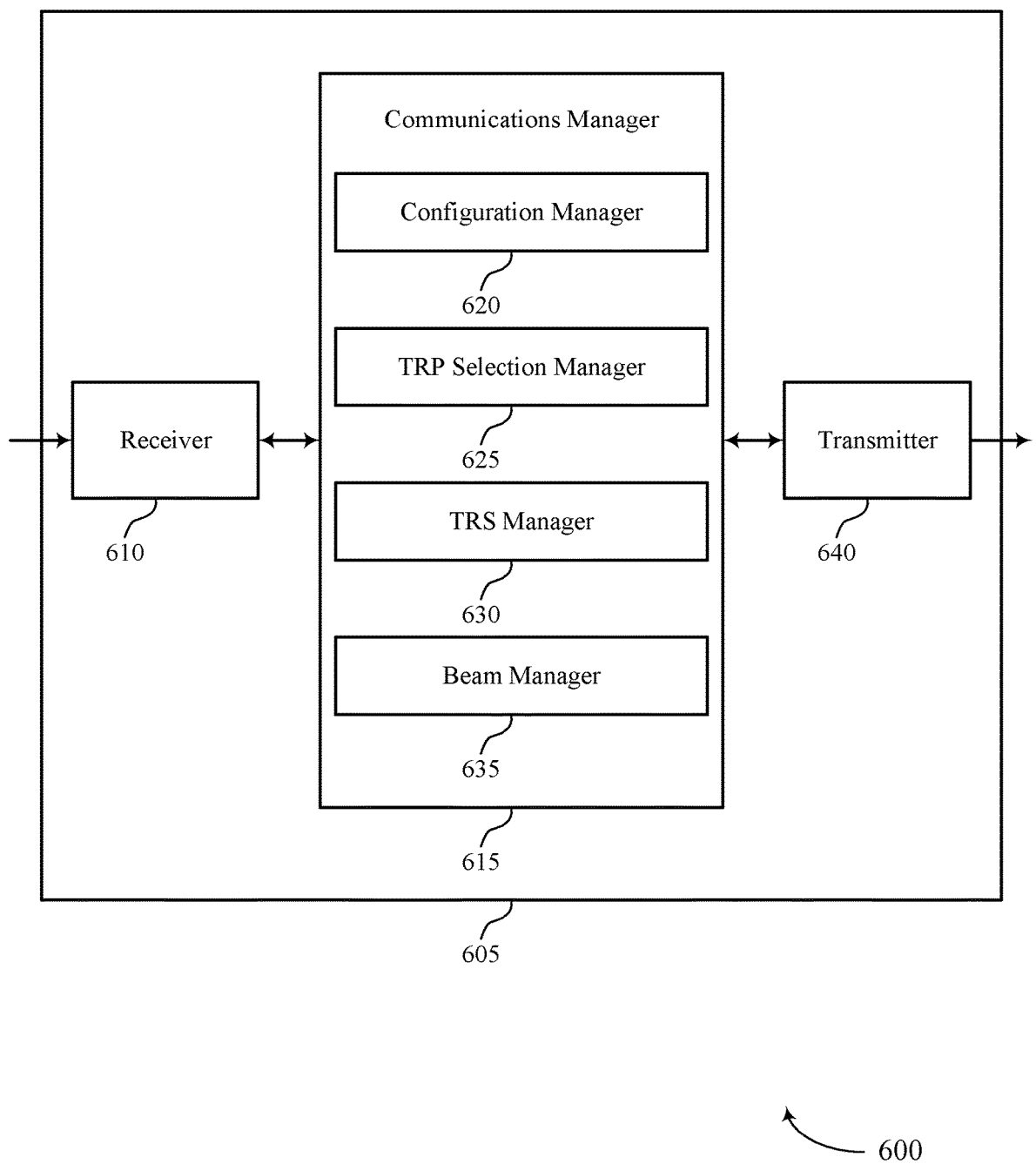

FIG. 6 shows a block diagram 600 of a device 605 that supports TRS techniques in wireless communications in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to TRS techniques in wireless communications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a configuration manager 620, a TRP selection manager 625, a TRS manager 630, and a beam manager 635. The communications manager 615 may be an example of aspects of the communications manager 810 described herein.

The configuration manager 620 may identify a set of TRPs that transmit joint communications to the UE, where each TRP of the set of TRPs has a separate cell identification.

The TRP selection manager 625 may determine a subset of the set of TRPs that are to transmit periodic TRSs.

The TRS manager 630 may monitor, based on the determining, for one or more TRSs from the subset of TRPs.

The beam manager 635 may update one or more joint communications parameters for joint communications with the set of TRPs based on the one or more TRSs from the subset of TRPs. In some cases, the joint communications parameters may include one or more of a transmit-receive beam pair, a timing error, a frequency error, or combinations thereof.

The transmitter 640 may transmit signals generated by other components of the device 605. In some examples, the transmitter 640 may be collocated with a receiver 610 in a transceiver. For example, the transmitter 640 may be an example of aspects of the transceiver 820 described with reference to FIG. 8. The transmitter 640 may utilize a single antenna or a set of antennas.

Figure 7:
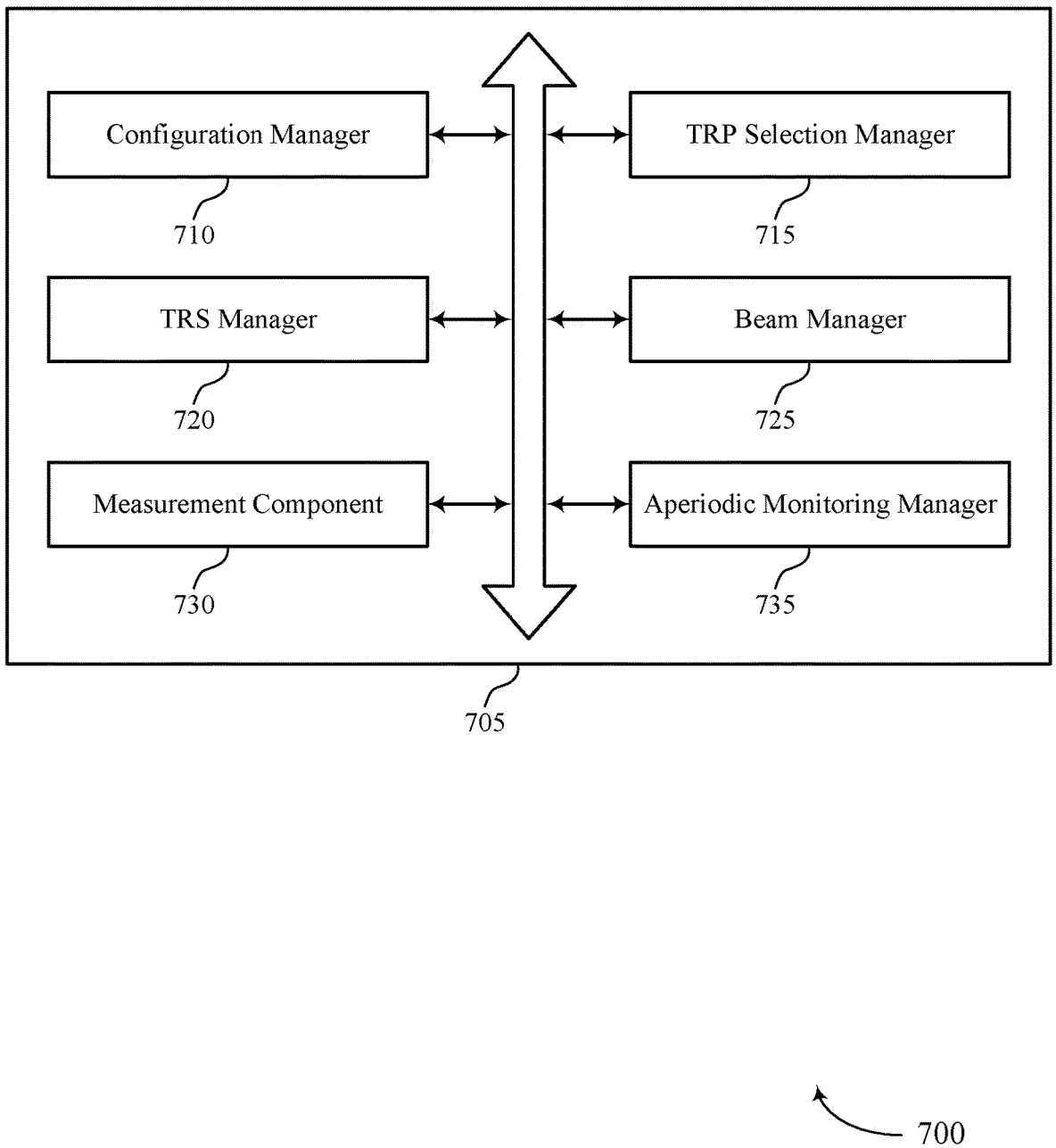
FIG. 7 shows a block diagram of a communications manager that supports tracking reference signal techniques in wireless communications in accordance with aspects of the present disclosure.

FIG. 7 shows a block diagram 700 of a communications manager 705 that supports TRS techniques in wireless communications in accordance with aspects of the present disclosure. The communications manager 705 may be an example of aspects of a communications manager 515, a communications manager 615, or a communications manager 810 described herein. The communications manager 705 may include a configuration manager 710, a TRP selection manager 715, a TRS manager 720, a beam manager 725, a measurement component 730, and an aperiodic monitoring manager 735. Each of these components may communicate, directly or indirectly, with one another (e.g., via one or more buses).

The configuration manager 710 may identify a set of TRPs that transmit joint communications to the UE, where each TRP of the set of TRPs has a separate cell identification. In some examples, the configuration manager 710 may receive configuration information from at least a first TRP of the set of TRPs that indicates the subset of TRPs that are to transmit the periodic TRSs, and where the determining is based on the configuration information.

In some examples, the configuration manager 710 may receive configuration information from at least a first TRP that indicates one or more of the predetermined number of TRPs that are to be selected as the subset of TRPs, or a RSRP threshold value for selecting one or more TRPs whose RSRP is higher than or equal to the RSRP threshold value as the subset of TRPs. In some cases, the configuration information is received in one or more of RRC signaling, a MAC-CE, or DCI from at least the first TRP.

The TRP selection manager 715 may determine a subset of the set of TRPs that are to transmit periodic TRSs. In some examples, the TRP selection manager 715 may select a predetermined number of TRPs from the set of TRPs as the subset of TRPs based on an ordering of the RSRP from each TRP.

The TRS manager 720 may monitor, based on the determining, for one or more TRSs from the subset of TRPs. In some examples, the TRS manager 720 may transmit a request to at least a first TRP to receive the periodic TRSs from the subset of TRPs. In some examples, two or more joint TRSs are transmitted by different groups of TRPs, and where each different group of TRPs is associated with a different cell identification. In some cases, the request is transmitted to at least the first TRP in a UCI transmission, a MAC-CE, in a RRC signaling transmission, in a UE assistance information feedback transmission, or any combinations thereof.

In some cases, the subset of TRPs is a first subset of TRPs, and where a second subset of the set of TRPs transmits one or more aperiodic TRSs or periodic TRSs, and where the second subset of TRPs is non-overlapping with the first subset of TRPs. In some cases, at least one of the one or more aperiodic TRSs is a joint TRS that is transmitted by two or more TRPs. In some cases, the two or more TRPs that transmit the joint TRS have one or more common radio frequency components or a common oscillator.

The beam manager 725 may update one or more of a transmit-receive beam pair, a timing error, or a frequency error for joint communications with the set of TRPs based on the one or more TRSs from the subset of TRPs. The measurement component 730 may measure a RSRP from each TRP of the set of TRPs.

The aperiodic monitoring manager 735 may monitor for one or more aperiodic TRSs from one or more TRPs of the second subset of TRPs. In some examples, the aperiodic monitoring manager 735 may receive a trigger that indicates to monitor for the one or more aperiodic TRSs, where the trigger is received from the first TRP having a different cell identification than at least a second TRP that transmits the one or more aperiodic TRSs.

In some cases, the trigger is received in a layer-one signal from the first TRP that dynamically indicates that the second TRP is to transmit the one or more aperiodic TRSs. In some cases, a set of resource sets are configured for a set of different aperiodic TRS configurations from a set of different TRPs, and where the trigger indicates an index value that is mapped to one of the set of resource sets. In some cases, at least one TRS resource set of the set of resource sets is associated with a group of two or more TRPs.

Figure 8:
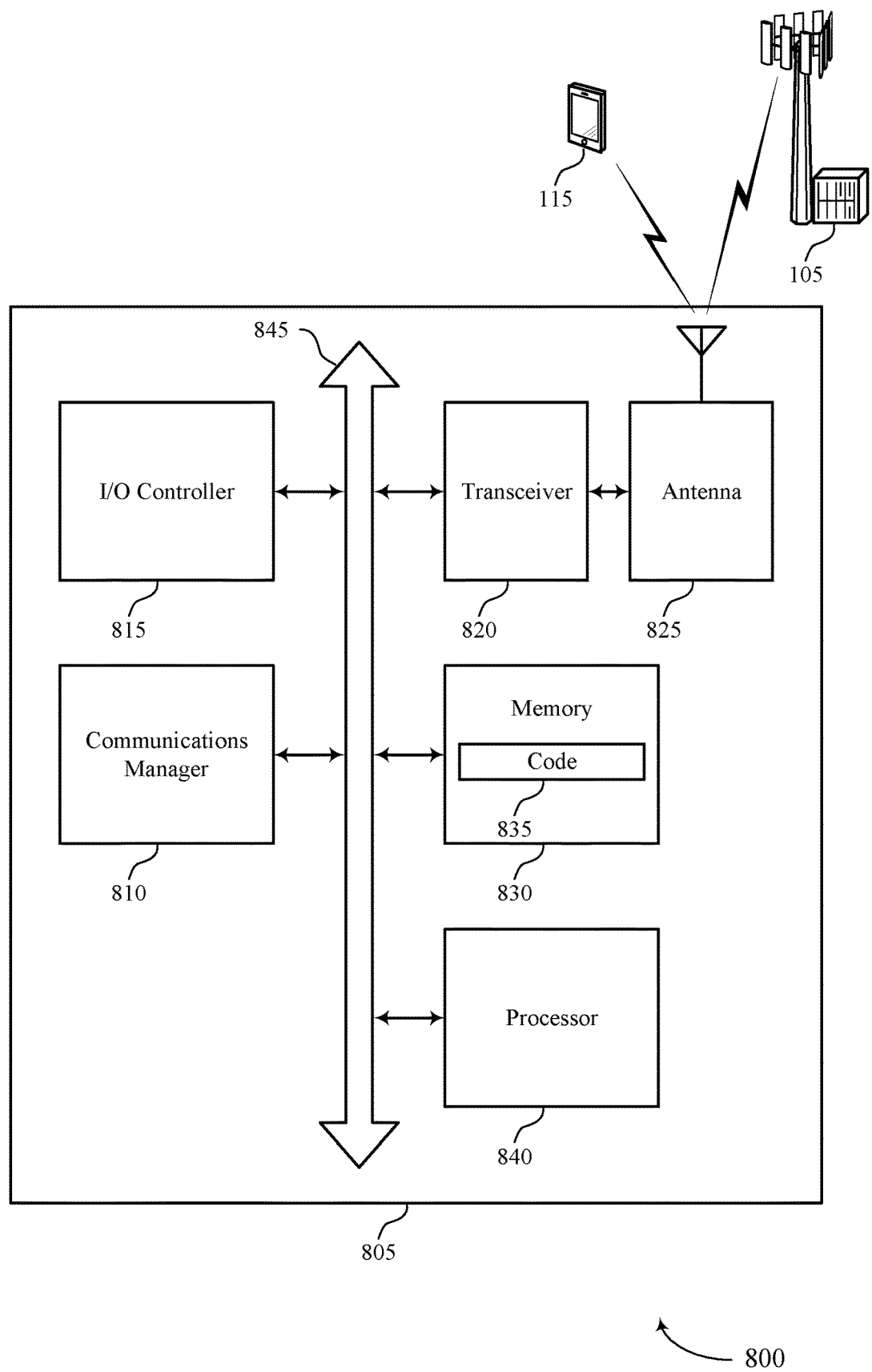
FIG. 8 shows a diagram of a system including a device that supports tracking reference signal techniques in wireless communications in accordance with aspects of the present disclosure.

FIG. 8 shows a diagram of a system 800 including a device 805 that supports TRS techniques in wireless communications in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a set of TRPs that transmit joint communications to the UE, where each TRP of the set of TRPs has a separate cell identification, determine a subset of the set of TRPs that are to transmit periodic TRSs, monitor, based on the determining, for one or more TRSs from the subset of TRPs, and update one or more joint communications parameters for joint communications with the set of TRPs based on the one or more TRSs from the subset of TRPs.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting TRS techniques in wireless communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
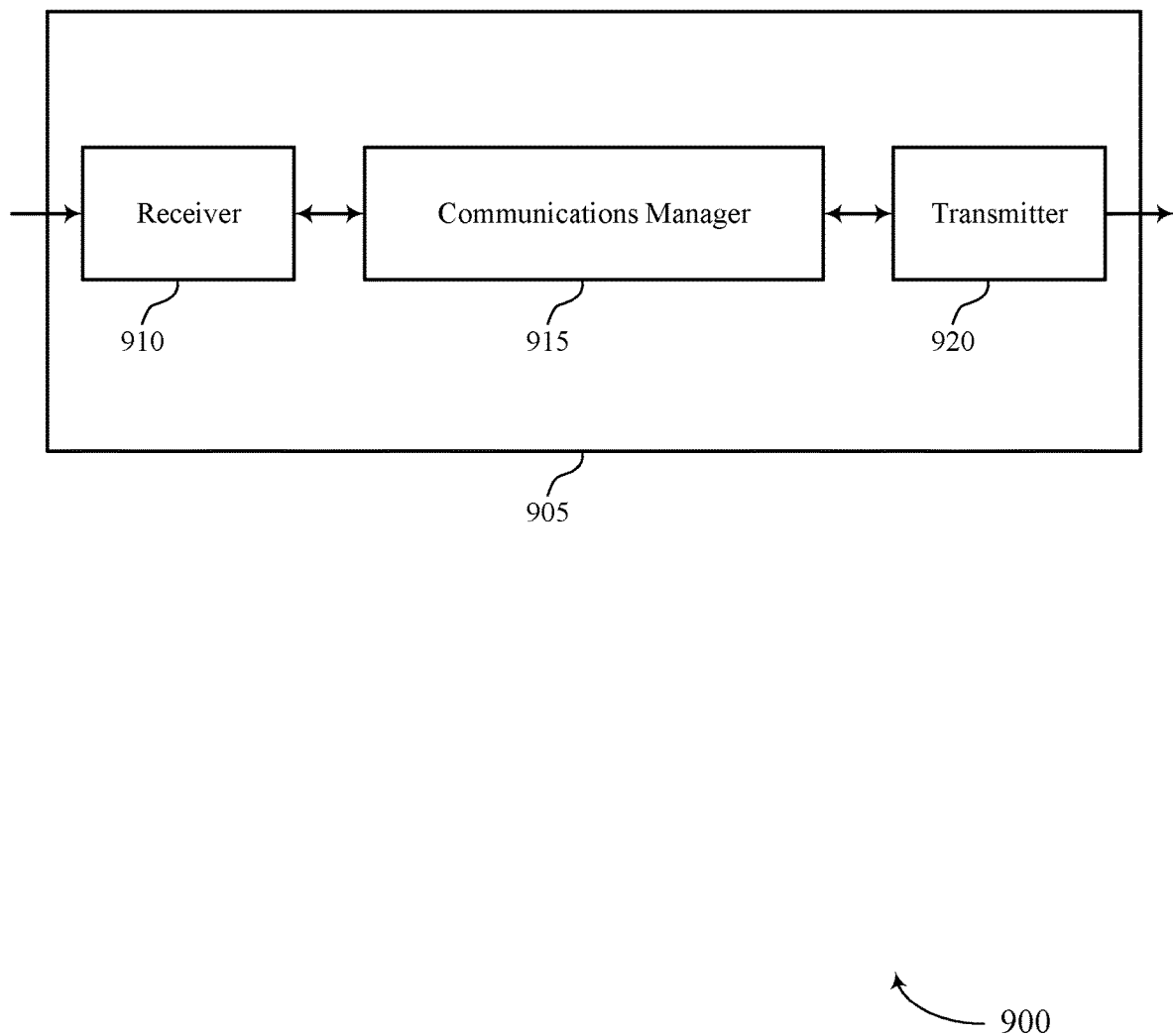
FIGS. 9 and 10 show block diagrams of devices that support tracking reference signal techniques in wireless communications in accordance with aspects of the present disclosure.

FIG. 9 shows a block diagram 900 of a device 905 that supports TRS techniques in wireless communications in accordance with aspects of the present disclosure. The device 905 may be an example of aspects of a base station 105 or TRP as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to TRS techniques in wireless communications, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a set of TRPs that transmit joint communications to at least a first UE, where each TRP of the set of TRPs has a separate cell identification, determine a subset of the set of TRPs that are to transmit periodic TRSs, and transmit, based on the determining, configuration information to at least the first UE that indicates the subset of TRPs that are to transmit the periodic TRSs. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver. For example, the transmitter 920 may be an example of aspects of the transceiver 1220 described with reference to FIG. 12. The transmitter 920 may utilize a single antenna or a set of antennas.

Figure 10:
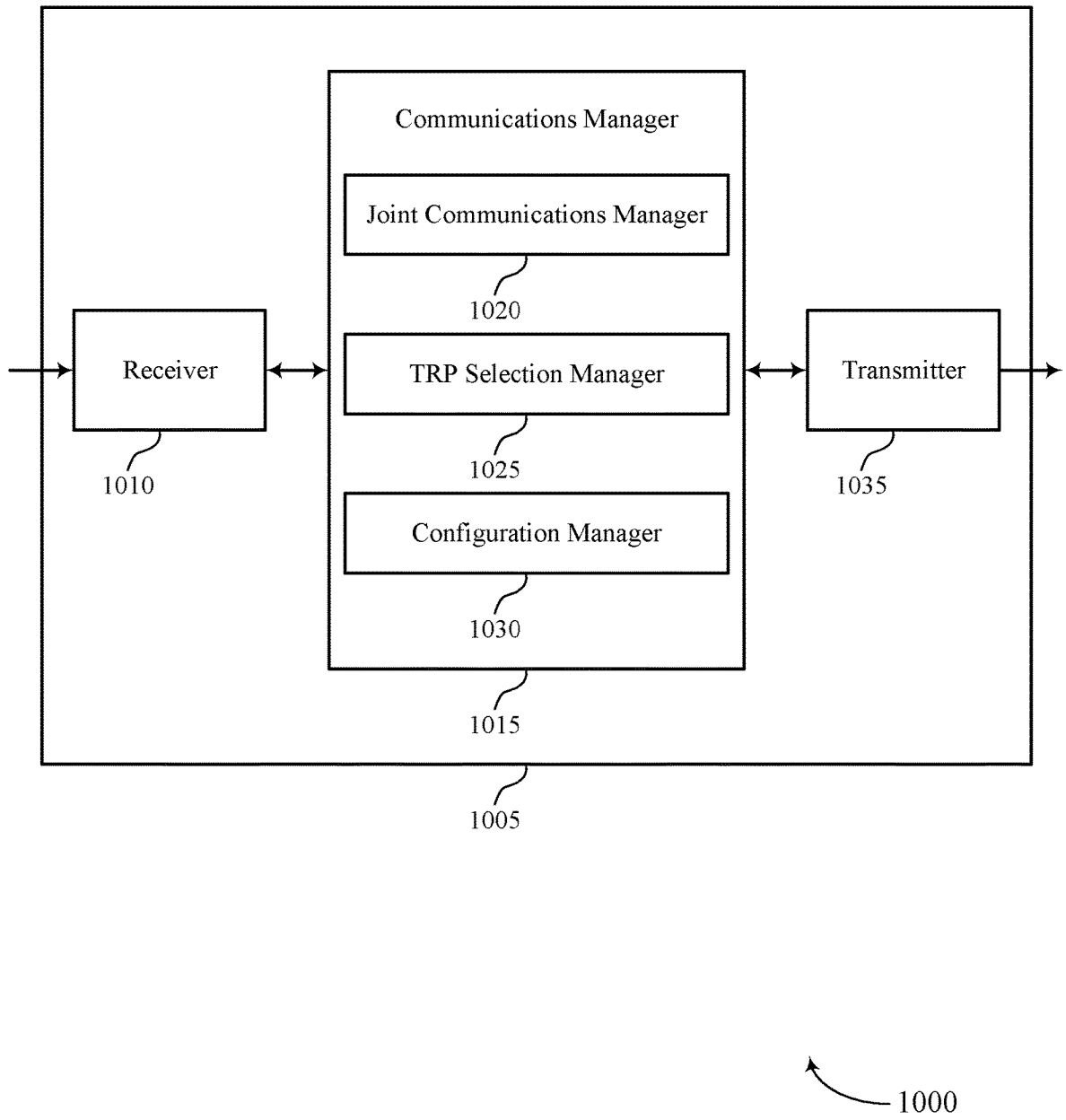

FIG. 10 shows a block diagram 1000 of a device 1005 that supports TRS techniques in wireless communications in accordance with aspects of the present disclosure. The device 1005 may be an example of aspects of a device 905, or a base station 105 or TRP as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to TRS techniques in wireless communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a joint communications manager 1020, a TRP selection manager 1025, and a configuration manager 1030. The communications manager 1015 may be an example of aspects of the communications manager 1210 described herein.

The joint communications manager 1020 may identify a set of TRPs that transmit joint communications to at least a first UE, where each TRP of the set of TRPs has a separate cell identification.

The TRP selection manager 1025 may determine a subset of the set of TRPs that are to transmit periodic TRSs.

The configuration manager 1030 may transmit, based on the determining, configuration information to at least the first UE that indicates the subset of TRPs that are to transmit the periodic TRSs.

The transmitter 1035 may transmit signals generated by other components of the device 1005. In some examples, the transmitter 1035 may be collocated with a receiver 1010 in a transceiver. For example, the transmitter 1035 may be an example of aspects of the transceiver 1220 described with reference to FIG. 12. The transmitter 1035 may utilize a single antenna or a set of antennas.

Figure 11:
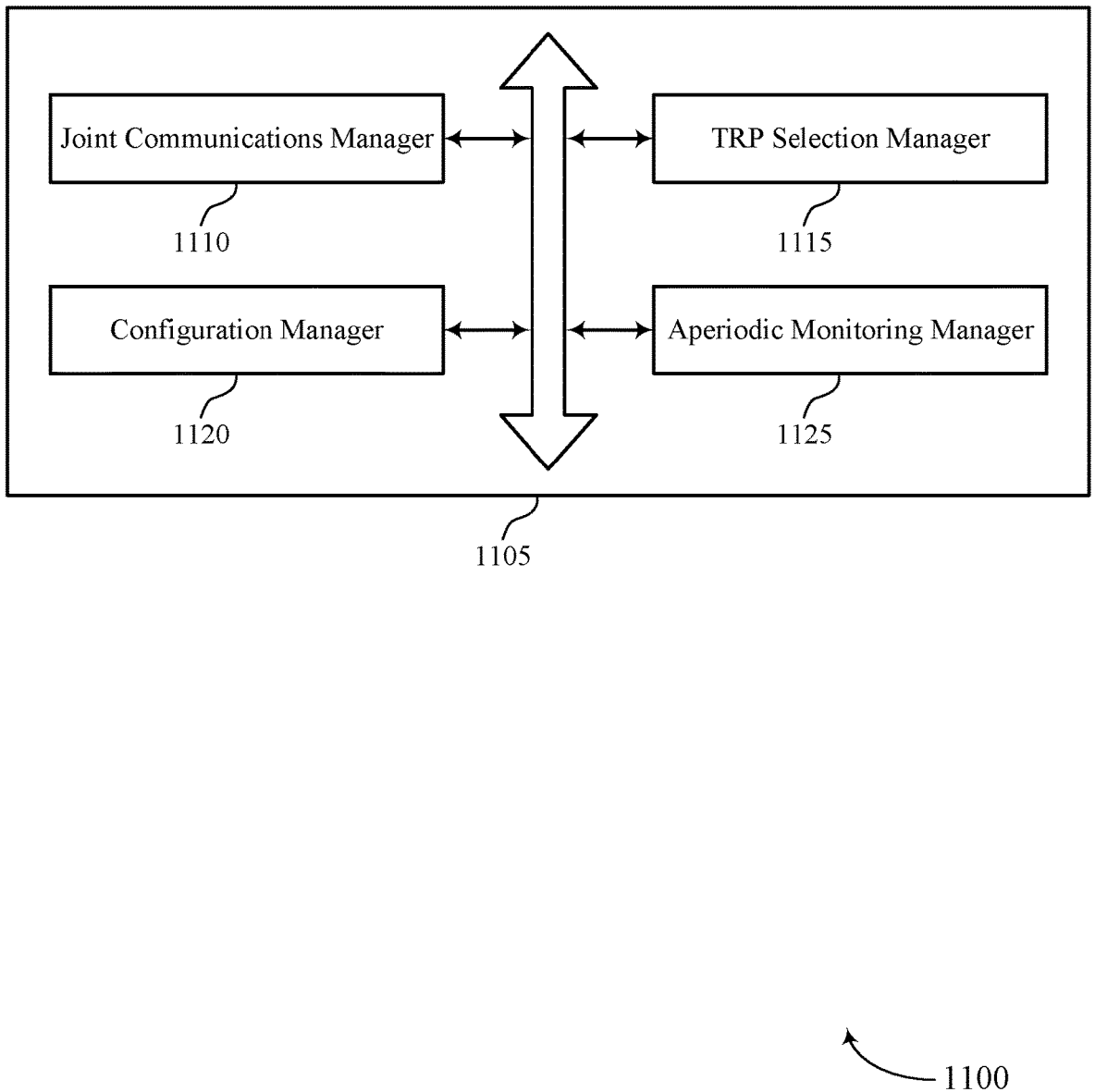
FIG. 11 shows a block diagram of a communications manager that supports tracking reference signal techniques in wireless communications in accordance with aspects of the present disclosure.

FIG. 11 shows a block diagram 1100 of a communications manager 1105 that supports TRS techniques in wireless communications in accordance with aspects of the present disclosure. The communications manager 1105 may be an example of aspects of a communications manager 915, a communications manager 1015, or a communications manager 1210 described herein. The communications manager 1105 may include a joint communications manager 1110, a TRP selection manager 1115, a configuration manager 1120, and an aperiodic monitoring manager 1125. Each of these components may communicate, directly or indirectly, with one another (e.g., via one or more buses).

The joint communications manager 1110 may identify a set of TRPs that transmit joint communications to at least a first UE, where each TRP of the set of TRPs has a separate cell identification.

In some examples, two or more joint TRSs are transmitted by different groups of TRPs, and where each different group of TRPs is associated with a different cell ID. In some cases, at least one of the one or more aperiodic TRSs is a joint TRS that is transmitted by two or more TRPs. In some cases, the two or more TRPs that transmit the joint TRS have one or more common radio frequency components or a common oscillator.

The TRP selection manager 1115 may determine a subset of the set of TRPs that are to transmit periodic TRSs. In some cases, the first TRP is not included in the subset of TRPs.

The configuration manager 1120 may transmit, based on the determining, configuration information to at least the first UE that indicates the subset of TRPs that are to transmit the periodic TRSs. In some cases, the configuration information is transmitted in one or more of RRC signaling, a MAC-CE, or DCI to at least the first UE. In some cases, the configuration information indicates that a predetermined number of the set of TRPs are to be selected as the subset of TRPs based on an ordering of a RSRP from each TRP of the set of TRPs.

The aperiodic monitoring manager 1125 may receive, from the first UE, a request to receive the periodic TRSs from the subset of TRPs. In some examples, the aperiodic monitoring manager 1125 may transmit a trigger to the first UE that indicates to monitor for the one or more aperiodic TRSs, where the trigger indicates the first UE is to monitor for at least one aperiodic TRS from a second TRP having a different cell identification than the first TRP. In some cases, the request is transmitted to at least the first TRP in a UCI transmission, a MAC-CE, in a RRC signaling transmission, in a UE assistance information feedback transmission, or any combinations thereof.

In some cases, the subset of TRPs is a first subset of TRPs, and where a second subset of the set of TRPs transmits one or more aperiodic TRSs or periodic TRSs, and where the second subset of TRPs is non-overlapping with the first subset of TRPs.

In some cases, the trigger is transmitted in a layer-one signal that dynamically indicates that the second TRP is to transmit the one or more aperiodic TRSs. In some cases, a set of resource sets are configured at the first UE for a set of different aperiodic TRS configurations from a set of different TRPs, and where the trigger indicates an index value that is mapped to one of the set of resource sets. In some cases, at least one TRS resource set of the set of resource sets is associated with a group of two or more TRPs.

Figure 12:
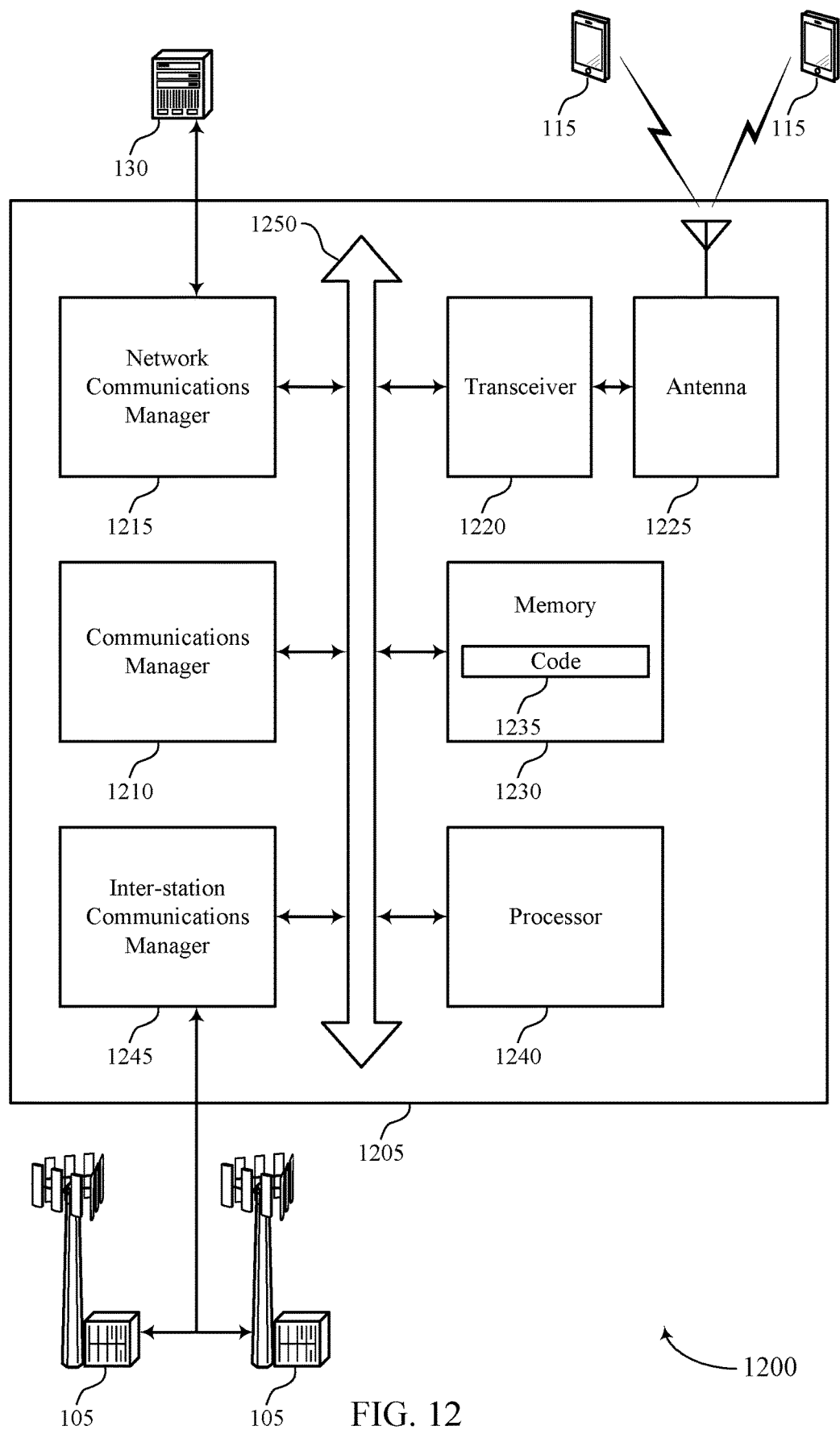
FIG. 12 shows a diagram of a system including a device that supports tracking reference signal techniques in wireless communications in accordance with aspects of the present disclosure.

FIG. 12 shows a diagram of a system 1200 including a device 1205 that supports TRS techniques in wireless communications in accordance with aspects of the present disclosure. The device 1205 may be an example of or include the components of device 905, device 1005, or a base station 105 or TRP as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a set of TRPs that transmit joint communications to at least a first UE, where each TRP of the set of TRPs has a separate cell identification, determine a subset of the set of TRPs that are to transmit periodic TRSs, and transmit, based on the determining, configuration information to at least the first UE that indicates the subset of TRPs that are to transmit the periodic TRSs.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting TRS techniques in wireless communications).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
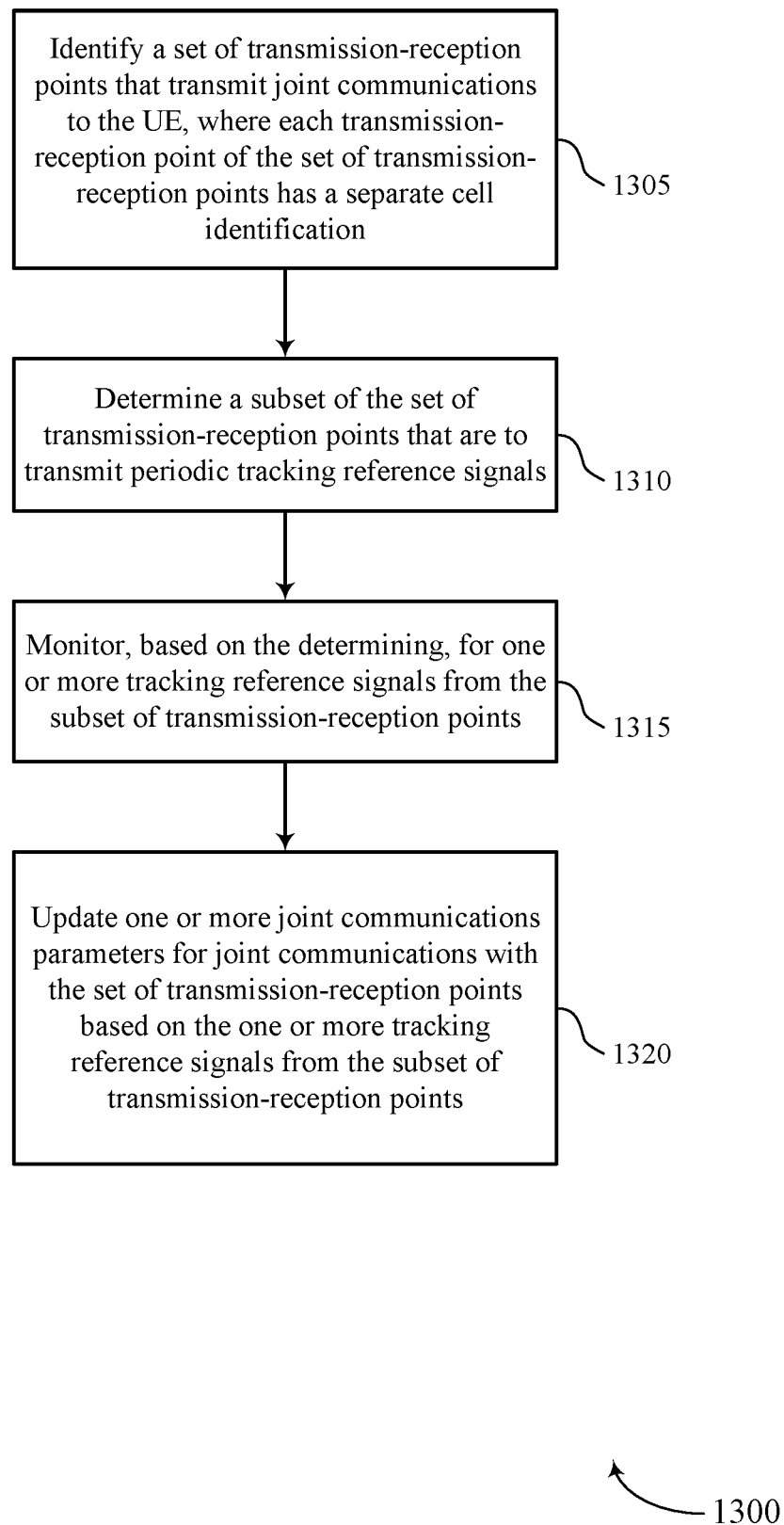
FIGS. 13 through 18 show flowcharts illustrating methods that support tracking reference signal techniques in wireless communications in accordance with aspects of the present disclosure.

FIG. 13 shows a flowchart illustrating a method 1300 that supports TRS techniques in wireless communications in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify a set of TRPs that transmit joint communications to the UE, where each TRP of the set of TRPs has a separate cell identification. The operations of 1305 may be performed according to the methods described herein. In some examples, aspects of the operations of 1305 may be performed by a configuration manager as described with reference to FIGS. 5 through 8.

At 1310, the UE may determine a subset of the set of TRPs that are to transmit periodic TRSs. The operations of 1310 may be performed according to the methods described herein. In some examples, aspects of the operations of 1310 may be performed by a TRP selection manager as described with reference to FIGS. 5 through 8.

At 1315, the UE may monitor, based on the determining, for one or more TRSs from the subset of TRPs. The operations of 1315 may be performed according to the methods described herein. In some examples, aspects of the operations of 1315 may be performed by a TRS manager as described with reference to FIGS. 5 through 8.

At 1320, the UE may update one or more joint communications parameters for joint communications with the set of TRPs based on the one or more TRSs from the subset of TRPs. The operations of 1320 may be performed according to the methods described herein. In some examples, aspects of the operations of 1320 may be performed by a beam manager as described with reference to FIGS. 5 through 8. In some cases, the joint communications parameters may include one or more of a transmit-receive beam pair, a timing error, or a frequency error.

Figure 14:
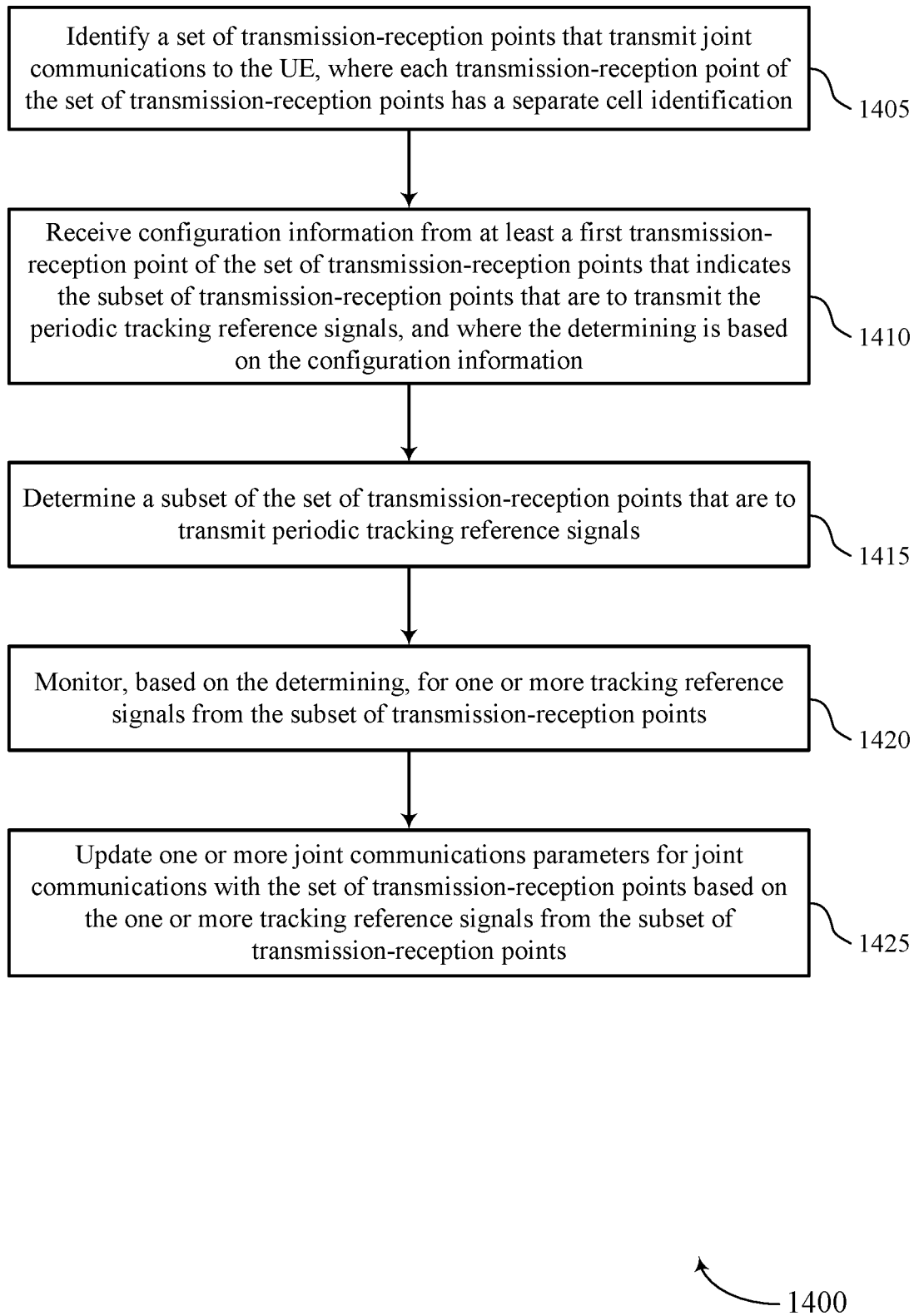

FIG. 14 shows a flowchart illustrating a method 1400 that supports TRS techniques in wireless communications in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may identify a set of TRPs that transmit joint communications to the UE, where each TRP of the set of TRPs has a separate cell identification. The operations of 1405 may be performed according to the methods described herein. In some examples, aspects of the operations of 1405 may be performed by a configuration manager as described with reference to FIGS. 5 through 8.

At 1410, the UE may receive configuration information from at least a first TRP of the set of TRPs that indicates the subset of TRPs that are to transmit the periodic TRSs, and where the determining is based on the configuration information. The operations of 1410 may be performed according to the methods described herein. In some examples, aspects of the operations of 1410 may be performed by a configuration manager as described with reference to FIGS. 5 through 8. In some cases, the configuration information is received in one or more of RRC signaling, a MAC-CE, or DCI from at least the first TRP.

At 1415, the UE may determine a subset of the set of TRPs that are to transmit periodic TRSs. The operations of 1415 may be performed according to the methods described herein. In some examples, aspects of the operations of 1415 may be performed by a TRP selection manager as described with reference to FIGS. 5 through 8.

At 1420, the UE may monitor, based on the determining, for one or more TRSs from the subset of TRPs. The operations of 1420 may be performed according to the methods described herein. In some examples, aspects of the operations of 1420 may be performed by a TRS manager as described with reference to FIGS. 5 through 8.

At 1425, the UE may update one or more joint communications parameters for joint communications with the set of TRPs based on the one or more TRSs from the subset of TRPs. The operations of 1425 may be performed according to the methods described herein. In some examples, aspects of the operations of 1425 may be performed by a beam manager as described with reference to FIGS. 5 through 8.

Figure 15:
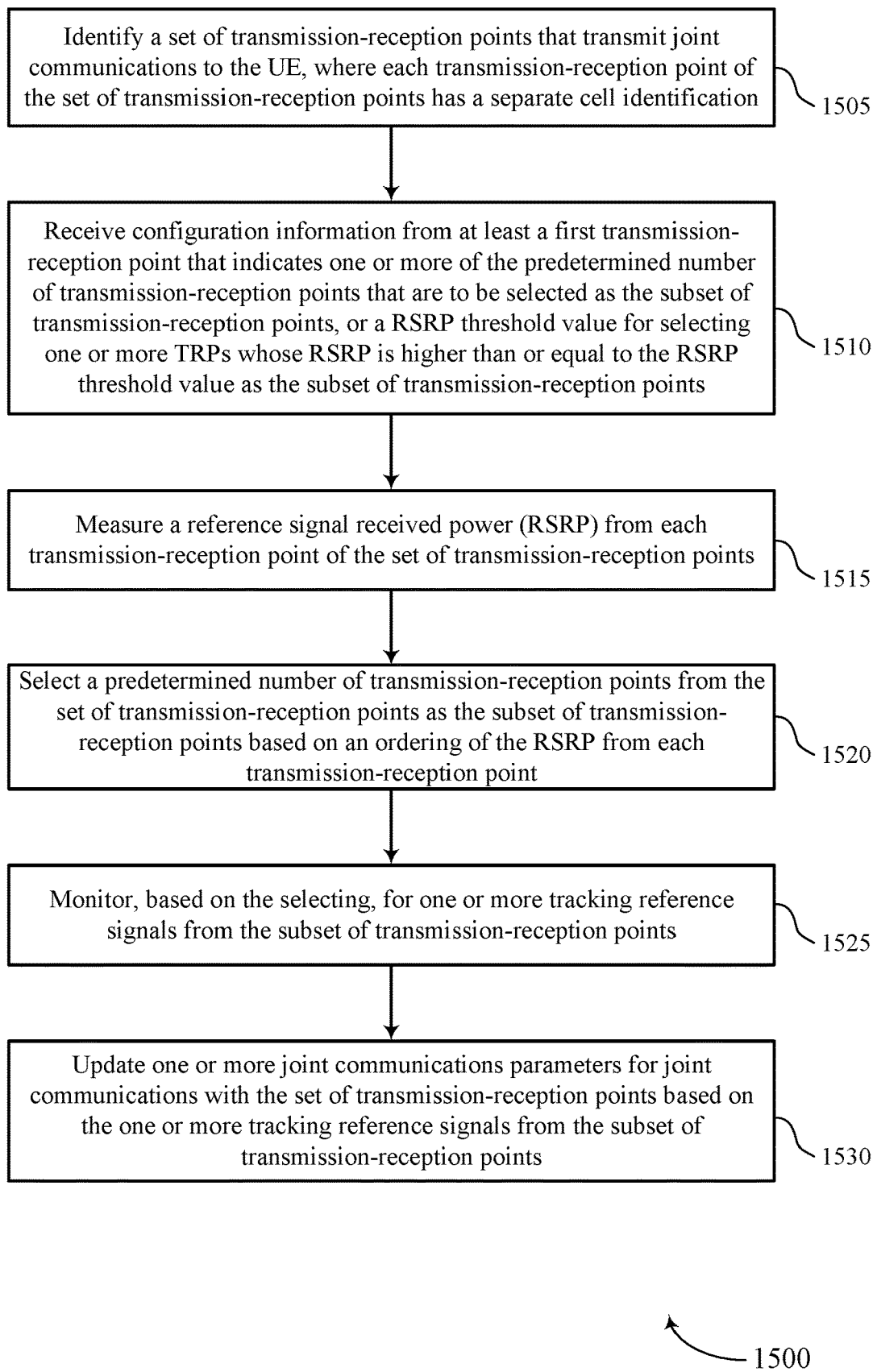

FIG. 15 shows a flowchart illustrating a method 1500 that supports TRS techniques in wireless communications in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may identify a set of TRPs that transmit joint communications to the UE, where each TRP of the set of TRPs has a separate cell identification. The operations of 1505 may be performed according to the methods described herein. In some examples, aspects of the operations of 1505 may be performed by a configuration manager as described with reference to FIGS. 5 through 8.

At 1510, the UE may receive configuration information from at least a first TRP that indicates one or more of the predetermined number of TRPs that are to be selected as the subset of TRPs, or a RSRP threshold value for selecting one or more TRPs whose RSRP is higher than or equal to the RSRP threshold value as the subset of TRPs. The operations of 1510 may be performed according to the methods described herein. In some examples, aspects of the operations of 1510 may be performed by a configuration manager as described with reference to FIGS. 5 through 8.

At 1515, the UE may measure a reference signal received power (RSRP) from each TRP of the set of TRPs. The operations of 1515 may be performed according to the methods described herein. In some examples, aspects of the operations of 1515 may be performed by a measurement component as described with reference to FIGS. 5 through 8.

At 1520, the UE may select a predetermined number of TRPs from the set of TRPs as the subset of TRPs based on an ordering of the RSRP from each TRP. The operations of 1520 may be performed according to the methods described herein. In some examples, aspects of the operations of 1520 may be performed by a TRP selection manager as described with reference to FIGS. 5 through 8.

At 1525, the UE may monitor, based on the selecting, for one or more TRSs from the subset of TRPs. The operations of 1525 may be performed according to the methods described herein. In some examples, aspects of the operations of 1525 may be performed by a TRS manager as described with reference to FIGS. 5 through 8.

At 1530, the UE may update one or more joint communications parameters for joint communications with the set of TRPs based on the one or more TRSs from the subset of TRPs. The operations of 1530 may be performed according to the methods described herein. In some examples, aspects of the operations of 1530 may be performed by a beam manager as described with reference to FIGS. 5 through 8.

Figure 16:
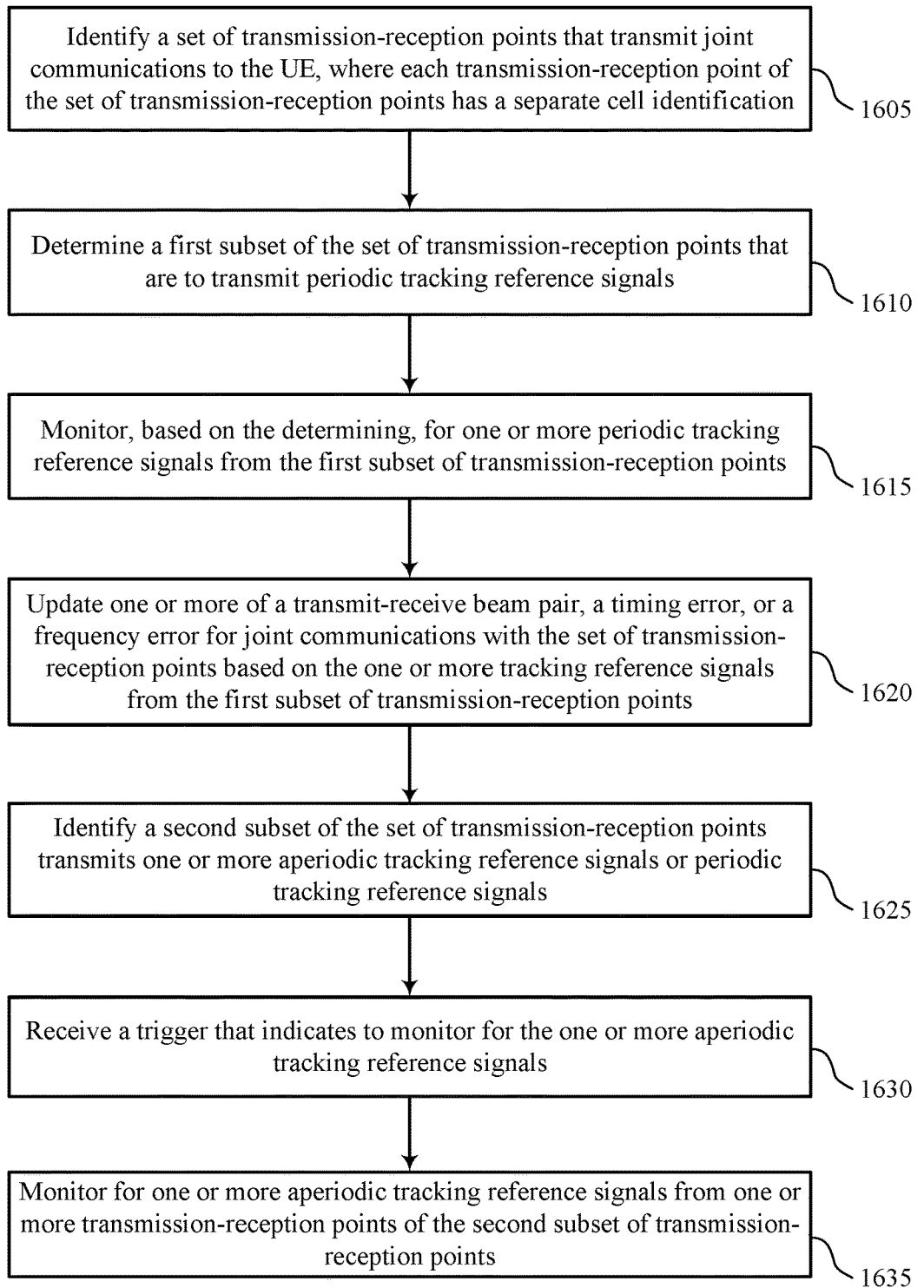

FIG. 16 shows a flowchart illustrating a method 1600 that supports TRS techniques in wireless communications in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may identify a set of TRPs that transmit joint communications to the UE, where each TRP of the set of TRPs has a separate cell identification. The operations of 1605 may be performed according to the methods described herein. In some examples, aspects of the operations of 1605 may be performed by a configuration manager as described with reference to FIGS. 5 through 8.

At 1610, the UE may determine a first subset of the set of TRPs that are to transmit periodic TRSs. The operations of 1610 may be performed according to the methods described herein. In some examples, aspects of the operations of 1610 may be performed by a TRP selection manager as described with reference to FIGS. 5 through 8.

At 1615, the UE may monitor, based on the determining, for one or more periodic TRSs from the first subset of TRPs. The operations of 1615 may be performed according to the methods described herein. In some examples, aspects of the operations of 1615 may be performed by a TRS manager as described with reference to FIGS. 5 through 8.

At 1620, the UE may update one or more of a transmit-receive beam pair, a timing error, or a frequency error for joint communications with the set of TRPs based on the one or more TRSs from the first subset of TRPs. The operations of 1620 may be performed according to the methods described herein. In some examples, aspects of the operations of 1620 may be performed by a beam manager as described with reference to FIGS. 5 through 8.

At 1625, the UE may identify a second subset of the set of TRPs transmits one or more aperiodic TRSs or periodic TRSs. The operations of 1625 may be performed according to the methods described herein. In some examples, aspects of the operations of 1625 may be performed by a TRS manager as described with reference to FIGS. 5 through 8. In some cases, the second subset of TRPs is non-overlapping with the first subset of TRPs.

At 1630, the UE may receive a trigger that indicates to monitor for the one or more aperiodic TRSs. The operations of 1630 may be performed according to the methods described herein. In some examples, aspects of the operations of 1630 may be performed by an aperiodic monitoring manager as described with reference to FIGS. 5 through 8. In some cases, the trigger is received from the first TRP having a different cell identification than at least a second TRP that transmits the one or more aperiodic TRSs. In some cases, the trigger is received in a layer-one signal from the first TRP that dynamically indicates that the second TRP is to transmit the one or more aperiodic TRSs.

At 1635, the UE may monitor for one or more aperiodic TRSs from one or more TRPs of the second subset of TRPs. The operations of 1635 may be performed according to the methods described herein. In some examples, aspects of the operations of 1635 may be performed by an aperiodic monitoring manager as described with reference to FIGS. 5 through 8.

Figure 17:
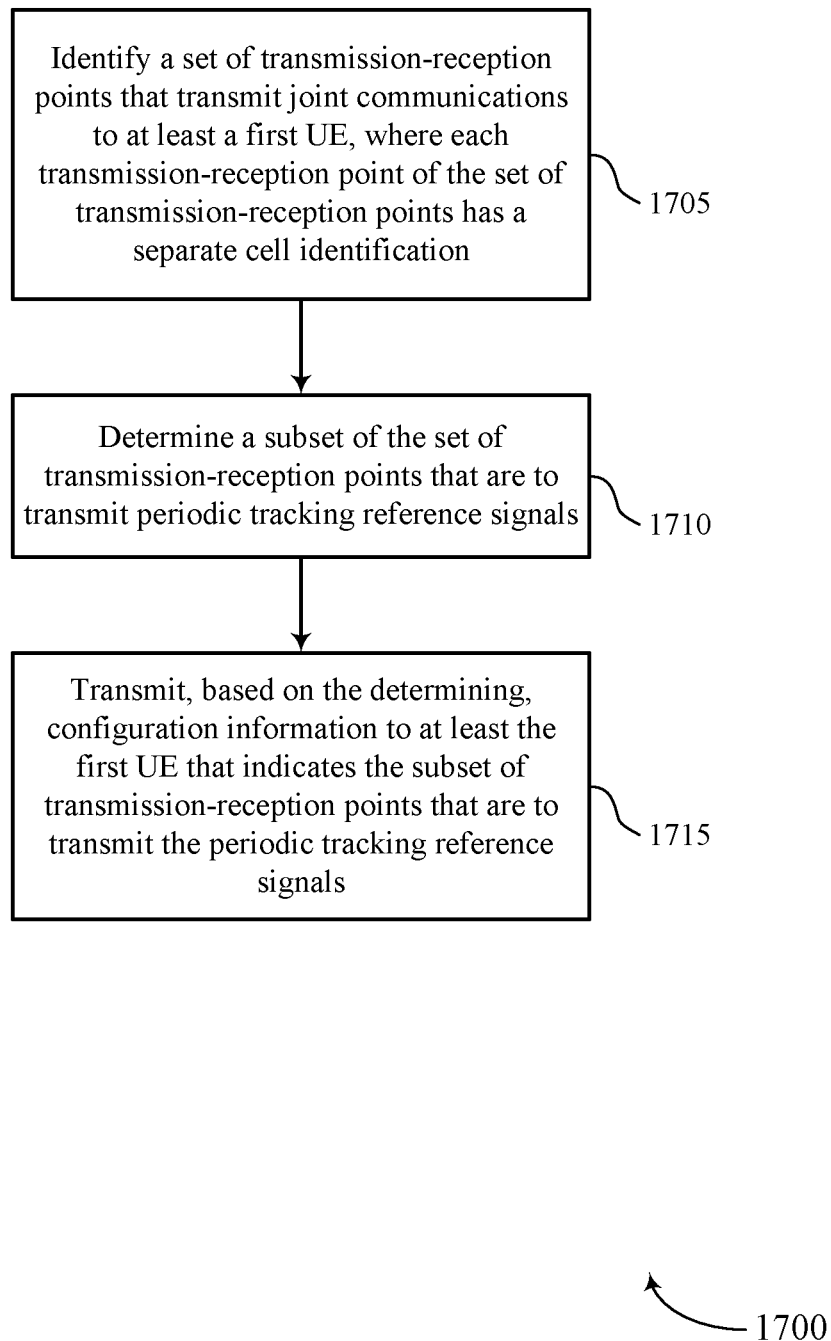

FIG. 17 shows a flowchart illustrating a method 1700 that supports TRS techniques in wireless communications in accordance with aspects of the present disclosure. The operations of method 1700 may be implemented by a base station 105 or TRP or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may identify a set of TRPs that transmit joint communications to at least a first UE, where each TRP of the set of TRPs has a separate cell identification. The operations of 1705 may be performed according to the methods described herein. In some examples, aspects of the operations of 1705 may be performed by a joint communications manager as described with reference to FIGS. 9 through 12.

At 1710, the base station may determine a subset of the set of TRPs that are to transmit periodic TRSs. The operations of 1710 may be performed according to the methods described herein. In some examples, aspects of the operations of 1710 may be performed by a TRP selection manager as described with reference to FIGS. 9 through 12.

At 1715, the base station may transmit, based on the determining, configuration information to at least the first UE that indicates the subset of TRPs that are to transmit the periodic TRSs. The operations of 1715 may be performed according to the methods described herein. In some examples, aspects of the operations of 1715 may be performed by a configuration manager as described with reference to FIGS. 9 through 12.

Figure 18:
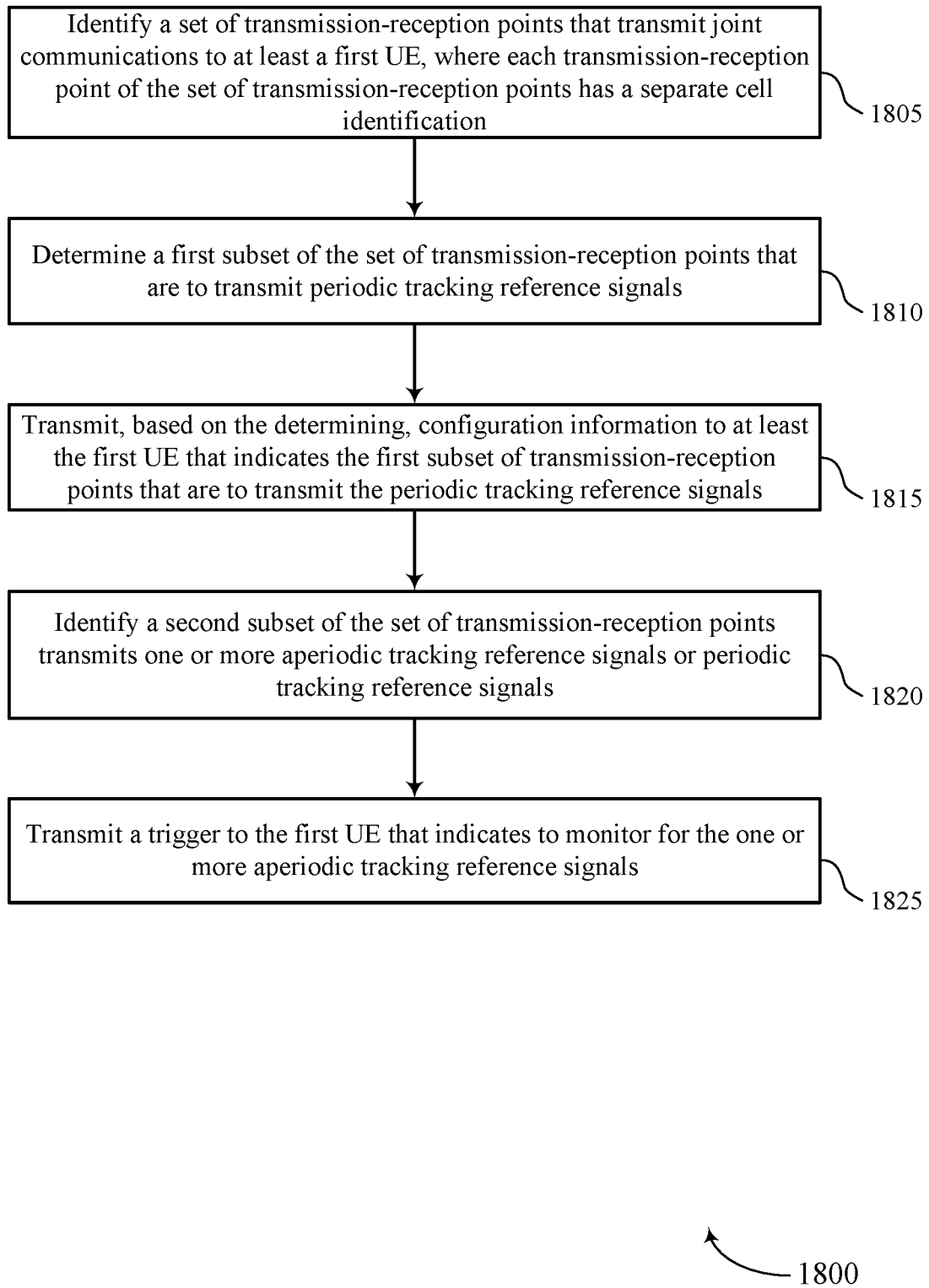

FIG. 18 shows a flowchart illustrating a method 1800 that supports TRS techniques in wireless communications in accordance with aspects of the present disclosure. The operations of method 1800 may be implemented by a base station 105 or TRP or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may identify a set of TRPs that transmit joint communications to at least a first UE, where each TRP of the set of TRPs has a separate cell identification. The operations of 1805 may be performed according to the methods described herein. In some examples, aspects of the operations of 1805 may be performed by a joint communications manager as described with reference to FIGS. 9 through 12.

At 1810, the base station may determine a first subset of the set of TRPs that are to transmit periodic TRSs. The operations of 1810 may be performed according to the methods described herein. In some examples, aspects of the operations of 1810 may be performed by a TRP selection manager as described with reference to FIGS. 9 through 12.

At 1815, the base station may transmit, based on the determining, configuration information to at least the first UE that indicates the first subset of TRPs that are to transmit the periodic TRSs. The operations of 1815 may be performed according to the methods described herein. In some examples, aspects of the operations of 1815 may be performed by a configuration manager as described with reference to FIGS. 9 through 12.

At 1820, the base station may identify a second subset of the set of TRPs transmits one or more aperiodic TRSs or periodic TRSs. The operations of 1820 may be performed according to the methods described herein. In some examples, aspects of the operations of 1820 may be performed by an aperiodic monitoring manager as described with reference to FIGS. 9 through 12. In some cases, the second subset of TRPs is non-overlapping with the first subset of TRPs.

At 1825, the base station may transmit a trigger to the first UE that indicates to monitor for the one or more aperiodic TRSs. The operations of 1825 may be performed according to the methods described herein. In some examples, aspects of the operations of 1825 may be performed by an aperiodic monitoring manager as described with reference to FIGS. 9 through 12. In some cases, the trigger indicates the first UE is to monitor for at least one aperiodic TRS from a second TRP having a different cell identification than the first TRP.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: identifying a set of transmission-reception points that transmit joint communications to the UE, wherein each transmission-reception point of the set of transmission-reception points has a separate cell identification; determining a subset of the set of transmission-reception points that are to transmit periodic tracking reference signals; monitoring, based at least in part on the determining, for one or more tracking reference signals from the subset of transmission-reception points; and updating one or more joint communications parameters for joint communications with the set of transmission-reception points based at least in part on the one or more tracking reference signals from the subset of transmission-reception points.

Aspect 2: The method of aspect 1, wherein the joint communications parameters comprise one or more of a transmit-receive beam pair, a timing error, or a frequency error.

Aspect 3: The method of any of aspects 1 through 2, further comprising: receiving configuration information from at least a first transmission-reception point of the set of transmission-reception points that indicates the subset of transmission-reception points that are to transmit the periodic tracking reference signals, and wherein the determining is based at least in part on the configuration information.

Aspect 4: The method of aspect 3, wherein the configuration information is received in one or more of RRC signaling, a medium access control (MAC) control element, or DCI from at least the first transmission-reception point.

Aspect 5: The method of any of aspects 1 through 4, wherein the determining comprises: measuring a reference signal received power (RSRP) from each transmission-reception point of the set of transmission-reception points; and selecting a predetermined number of transmission-reception points from the set of transmission-reception points as the subset of transmission-reception points based at least in part on an ordering of the RSRP from each transmission-reception point.

Aspect 6: The method of aspect 5, wherein the determining further comprises: receiving configuration information from at least a first transmission-reception point that indicates one or more of the predetermined number of transmission-reception points that are to be selected as the subset of transmission-reception points, or a RSRP threshold value for selecting one or more TRPs whose RSRP is higher than or equal to the RSRP threshold value, as the subset of transmission-reception points.

Aspect 7: The method of any of aspects 1 through 6, further comprising: transmitting a request to at least a first transmission-reception point to receive the periodic tracking reference signals from the subset of transmission-reception points.

Aspect 8: The method of aspect 7, wherein the request is transmitted to at least the first transmission-reception point in an uplink control information (UCI) transmission, a medium access control (MAC) control element, in an RRC signaling transmission, in a UE assistance information feedback transmission, or any combinations thereof.

Aspect 9: The method of any of aspects 1 through 8, wherein the subset of transmission-reception points is a first subset of transmission-reception points, and a second subset of the set of transmission-reception points transmits one or more aperiodic tracking reference signals or periodic tracking reference signals, and the second subset of transmission-reception points is non-overlapping with the first subset of transmission-reception points.

Aspect 10: The method of aspect 9, further comprising: monitoring for one or more aperiodic tracking reference signals from one or more transmission-reception points of the second subset of transmission-reception points.

Aspect 11: The method of aspect 10, wherein the monitoring for the one or more aperiodic tracking reference signals comprises: receiving a trigger that indicates to monitor for the one or more aperiodic tracking reference signals, wherein the trigger is received from the first transmission-reception point having a different cell identification than at least a second transmission-reception point that transmits the one or more aperiodic tracking reference signals.

Aspect 12: The method of aspect 11, wherein the trigger is received in a layer-one signal from the first transmission-reception point that dynamically indicates that the second transmission-reception point is to transmit the one or more aperiodic tracking reference signals.

Aspect 13: The method of any of aspects 11 through 12, wherein a plurality of resource sets are configured for a plurality of different aperiodic tracking reference signal configurations from a plurality of different transmission-reception points, and the trigger indicates an index value that is mapped to one of the plurality of resource sets.

Aspect 14: The method of aspect 13, wherein at least one tracking reference signal resource set of the plurality of resource sets is associated with a group of two or more transmission-reception points.

Aspect 15: The method of any of aspects 9 through 14, wherein at least one of the one or more aperiodic tracking reference signals is a joint tracking reference signal that is transmitted by two or more transmission-reception points.

Aspect 16: The method of aspect 15, wherein the two or more transmission-reception points that transmit the joint tracking reference signal have one or more common radio frequency components or a common oscillator.

Aspect 17: The method of any of aspects 15 through 16, wherein two or more joint tracking reference signals are transmitted by different groups of transmission-reception points, and wherein each different group of transmission-reception points is associated with a different cell identification.

Aspect 18: A method for wireless communication at a first transmission-reception point, comprising: identifying a set of transmission-reception points that transmit joint communications to at least a first UE, wherein each transmission-reception point of the set of transmission-reception points has a separate cell identification; determining a subset of the set of transmission-reception points that are to transmit periodic tracking reference signals; and transmitting, based at least in part on the determining, configuration information to at least the first UE that indicates the subset of transmission-reception points that are to transmit the periodic tracking reference signals.

Aspect 19: The method of aspect 18, wherein the first transmission-reception point is not included in the subset of transmission-reception points.

Aspect 20: The method of any of aspects 18 through 19, wherein the configuration information is transmitted in one or more of RRC signaling, a medium access control (MAC) control element, or DCI to at least the first UE.

Aspect 21: The method of any of aspects 18 through 20, wherein the configuration information indicates that a predetermined number of the set of transmission-reception points are to be selected as the subset of transmission-reception points based at least in part on an ordering of a reference signal received power (RSRP) from each transmission-reception point of the set of transmission-reception points.

Aspect 22: The method of any of aspects 18 through 21, further comprising: receiving, from the first UE, a request to receive the periodic tracking reference signals from the subset of transmission-reception points.

Aspect 23: The method of aspect 22, wherein the request is transmitted to at least the first transmission-reception point in an uplink control information (UCI) transmission, a medium access control (MAC) control element, in an RRC signaling transmission, in a UE assistance information feedback transmission, or any combinations thereof.

Aspect 24: The method of any of aspects 18 through 23, wherein the subset of transmission-reception points is a first subset of transmission-reception points, and a second subset of the set of transmission-reception points transmits one or more aperiodic tracking reference signals or periodic tracking reference signals, and the second subset of transmission-reception points is non-overlapping with the first subset of transmission-reception points.

Aspect 25: The method of aspect 24, further comprising: transmitting a trigger to the first UE that indicates to monitor for the one or more aperiodic tracking reference signals, wherein the trigger indicates the first UE is to monitor for at least one aperiodic tracking reference signal from a second transmission-reception point having a different cell identification than the first transmission-reception point.

Aspect 26: The method of aspect 25, wherein the trigger is transmitted in a layer-one signal that dynamically indicates that the second transmission-reception point is to transmit the one or more aperiodic tracking reference signals.

Aspect 27: The method of any of aspects 25 through 26, wherein a plurality of resource sets are configured at the first UE for a plurality of different aperiodic tracking reference signal configurations from a plurality of different transmission-reception points, and the trigger indicates an index value that is mapped to one of the plurality of resource sets.

Aspect 28: The method of aspect 27, wherein at least one tracking reference signal resource set of the plurality of resource sets is associated with a group of two or more transmission-reception points.

Aspect 29: The method of any of aspects 25 through 28, wherein at least one of the one or more aperiodic tracking reference signals is a joint tracking reference signal that is transmitted by two or more transmission-reception points.

Aspect 30: The method of aspect 29, wherein the two or more transmission-reception points that transmit the joint tracking reference signal have one or more common radio frequency components or a common oscillator.

Aspect 31: The method of any of aspects 29 through 30, wherein two or more joint tracking reference signals are transmitted by different groups of transmission-reception points, and wherein each different group of transmission-reception points is associated with a different cell ID.

Aspect 32: An apparatus for wireless communication at a UE, comprising a processor; memory coupled with the processor; and instructions stored in the memory and executable by the processor to cause the apparatus to perform a method of any of aspects 1 through 17.

Aspect 33: An apparatus for wireless communication at a UE, comprising at least one means for performing a method of any of aspects 1 through 17.

Aspect 34: A non-transitory computer-readable medium storing code for wireless communication at a UE, the code comprising instructions executable by a processor to perform a method of any of aspects 1 through 17.

Aspect 35: An apparatus for wireless communication at a first transmission-reception point, comprising a processor; memory coupled with the processor; and instructions stored in the memory and executable by the processor to cause the apparatus to perform a method of any of aspects 18 through 31.

Aspect 36: An apparatus for wireless communication at a first transmission-reception point, comprising at least one means for performing a method of any of aspects 18 through 31.

Aspect 37: A non-transitory computer-readable medium storing code for wireless communication at a first transmission-reception point, the code comprising instructions executable by a processor to perform a method of any of aspects 18 through 31.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a set of transmission-reception points that transmit joint communications to the UE, wherein each transmission-reception point of the set of transmission-reception points has a separate cell identification;
    receiving configuration information via radio resource control (RRC) signaling from at least a first transmission-reception point of the set of transmission-reception points that indicates a subset of transmission-reception points that are to transmit periodic tracking reference signals;
    identifying the subset of the set of transmission-reception points that are to transmit the periodic tracking reference signals, wherein the identifying of the subset is based at least in part on the configuration information;
    monitoring, based at least in part on the identifying of the subset, for one or more tracking reference signals from the subset of transmission-reception points; and
    updating one or more joint communications parameters for joint communications with the set of transmission-reception points based at least in part on the one or more tracking reference signals from the subset of transmission-reception points, the one or more joint communications parameters comprising at least one transmit-receive beam pair.

2. The method of claim 1, wherein:
    the joint communications parameters further comprise one or more of a timing error or a frequency error.

3. The method of claim 1, wherein the identifying of the subset comprises:
    measuring a reference signal received power (RSRP) from each transmission-reception point of the set of transmission-reception points; and
    selecting a predetermined number of transmission-reception points from the subset of transmission-reception points based at least in part on an ordering of the RSRP from each transmission-reception point.

4. The method of claim 3, wherein the configuration information indicates one or more of the predetermined number of transmission-reception points that are to be selected from the subset of transmission-reception points, or a RSRP threshold value for selecting one or more TRPs whose RSRP is higher than or equal to the RSRP threshold value, from the subset of transmission-reception points.

5. The method of claim 1, further comprising:
    transmitting a request to at least a first transmission-reception point to receive the periodic tracking reference signals from the subset of transmission-reception points.

6. The method of claim 5, wherein the request is transmitted to at least the first transmission-reception point in an uplink control information (UCI) transmission, a medium access control (MAC) control element, in a radio resource control (RRC) signaling transmission, in a UE assistance information feedback transmission, or any combinations thereof.

7. The method of claim 1, wherein the subset of transmission-reception points is a first subset of transmission-reception points, and wherein a second subset of the set of transmission-reception points transmits one or more aperiodic tracking reference signals or periodic tracking reference signals, and wherein the second subset of transmission-reception points is non-overlapping with the first subset of transmission-reception points.

8. The method of claim 7, further comprising:
monitoring for one or more aperiodic tracking reference signals from one or more transmission-reception points of the second subset of transmission-reception points.

9. The method of claim 8, wherein the monitoring for the one or more aperiodic tracking reference signals comprises:
receiving a trigger that indicates to monitor for the one or more aperiodic tracking reference signals, wherein the trigger is received from the first transmission-reception point having a different cell identification than at least a second transmission-reception point that transmits the one or more aperiodic tracking reference signals.

10. The method of claim 9, wherein the trigger is received in a layer-one signal from the first transmission-reception point that dynamically indicates that the second transmission-reception point is to transmit the one or more aperiodic tracking reference signals.

11. The method of claim 9, wherein a plurality of resource sets are configured for a plurality of different aperiodic tracking reference signal configurations from a plurality of different transmission-reception points, and wherein the trigger indicates an index value that is mapped to one of the plurality of resource sets.

12. The method of claim 11, wherein at least one tracking reference signal resource set of the plurality of resource sets is associated with a group of two or more transmission-reception points.

13. The method of claim 7, wherein at least one of the one or more aperiodic tracking reference signals is a joint tracking reference signal that is transmitted by two or more transmission-reception points.

14. The method of claim 13, wherein the two or more transmission-reception points that transmit the joint tracking reference signal have one or more common radio frequency components or a common oscillator.

15. The method of claim 13, wherein:
two or more joint tracking reference signals are transmitted by different groups of transmission-reception points, and wherein each different group of transmission-reception points is associated with a different cell identification.

16. A method for wireless communication at a first transmission-reception point, comprising:
identifying a set of transmission-reception points that transmit joint communications to at least a first user equipment (UE), wherein each transmission-reception point of the set of transmission-reception points has a separate cell identification;
identifying a subset of the set of transmission-reception points that are to transmit periodic tracking reference signals, wherein the subset of transmission-reception points is a first subset of transmission-reception points, and wherein a second subset of the set of transmission-reception points transmits one or more aperiodic tracking reference signals or periodic tracking reference signals, and wherein the second subset of transmission-reception points is non-overlapping with the first subset of transmission-reception points; and
transmitting, based at least in part on the identifying, configuration information to at least the first UE that indicates the subset of transmission-reception points that are to transmit the periodic tracking reference signals.

17. The method of claim 16, wherein the first transmission-reception point is not included in the subset of transmission-reception points.

18. The method of claim 16, wherein the configuration information is transmitted in one or more of radio resource control (RRC) signaling, a medium access control (MAC) control element, or downlink control information (DCI) to at least the first UE.

19. The method of claim 16, wherein the configuration information indicates that a predetermined number of the set of transmission-reception points are to be selected as the subset of transmission-reception points based at least in part on an ordering of a reference signal received power (RSRP) from each transmission-reception point of the set of transmission-reception points.

20. The method of claim 16, further comprising:
receiving, from the first UE, a request to receive the periodic tracking reference signals from the subset of transmission-reception points.

21. The method of claim 20, wherein the request is transmitted to at least the first transmission-reception point in an uplink control information (UCI) transmission, a medium access control (MAC) control element, in a radio resource control (RRC) signaling transmission, in a UE assistance information feedback transmission, or any combinations thereof.

22. The method of claim 16, further comprising:
transmitting a trigger to the first UE that indicates to monitor for the one or more aperiodic tracking reference signals, wherein the trigger indicates the first UE is to monitor for at least one aperiodic tracking reference signal from a second transmission-reception point having a different cell identification than the first transmission-reception point.

23. The method of claim 22, wherein the trigger is transmitted in a layer-one signal that dynamically indicates that the second transmission-reception point is to transmit the one or more aperiodic tracking reference signals.

24. The method of claim 22, wherein a plurality of resource sets are configured at the first UE for a plurality of different aperiodic tracking reference signal configurations from a plurality of different transmission-reception points, and wherein the trigger indicates an index value that is mapped to one of the plurality of resource sets.

25. The method of claim 24, wherein at least one tracking reference signal resource set of the plurality of resource sets is associated with a group of two or more transmission-reception points.

26. The method of claim 22, wherein at least one of the one or more aperiodic tracking reference signals is a joint tracking reference signal that is transmitted by two or more transmission-reception points.

27. The method of claim 26, wherein the two or more transmission-reception points that transmit the joint tracking reference signal have one or more common radio frequency components or a common oscillator.

28. The method of claim 26, wherein:
two or more joint tracking reference signals are transmitted by different groups of transmission-reception points, and wherein each different group of transmission-reception points is associated with a different cell ID.

29. An apparatus for wireless communication at a user equipment (UE), comprising:
one or more processors,
memory coupled with the one or more processors; and
instructions stored in the memory and executable by the one or more processors to cause the apparatus to:
identify a set of transmission-reception points that transmit joint communications to the UE, wherein each transmission-reception point of the set of transmission-reception points has a separate cell identification;

receive configuration information via radio resource control (RRC) signaling from at least a first transmission-reception point of the set of transmission-reception points that indicates a subset of transmission-reception points that are to transmit periodic tracking reference signals;

identify the subset of the set of transmission-reception points that are to transmit the periodic tracking reference signals, wherein the identifying of the subset is based at least in part on the configuration information;

monitor, based at least in part on the identification of the subset, for one or more tracking reference signals from the subset of transmission-reception points; and update one or more joint communications parameters for joint communications with the set of transmission-reception points based at least in part on the one or more tracking reference signals from the subset of transmission-reception points, the one or more joint communications parameters comprising at least one transmit-receive beam pair.

30. The apparatus of claim 29, wherein:
the joint communications parameters further comprise one or more of a timing error or a frequency error.

31. The apparatus of claim 29, wherein the instructions are further executable by the one or more processors to cause the apparatus to:
measure a reference signal received power (RSRP) from each transmission-reception point of the set of transmission-reception points;
select a predetermined number of transmission-reception points from the subset of transmission-reception points based at least in part on an ordering of the RSRP from each transmission-reception point, wherein the configuration information indicates one or more of the predetermined number of transmission-reception points that are to be selected from the subset of transmission-reception points, or a RSRP threshold value for selecting one or more TRPs whose RSRP is higher than or equal to the RSRP threshold value from the subset of transmission-reception points.

32. The apparatus of claim 29, wherein the instructions are further executable by the one or more processors to cause the apparatus to:
transmit a request to at least a first transmission-reception point to receive the periodic tracking reference signals from the subset of transmission-reception points.

33. The apparatus of claim 29, wherein the subset of transmission-reception points is a first subset of transmission-reception points, and wherein a second subset of the set of transmission-reception points transmits one or more aperiodic tracking reference signals or periodic tracking reference signals, and wherein the second subset of transmission-reception points is non-overlapping with the first subset of transmission-reception points.

34. The apparatus of claim 33, wherein the instructions are further executable by the one or more processors to cause the apparatus to:
monitor for one or more aperiodic tracking reference signals from one or more transmission-reception points of the second subset of transmission-reception points; and
receive a trigger that indicates to monitor for the one or more aperiodic tracking reference signals, wherein the trigger is received from the first transmission-reception point having a different cell identification than at least a second transmission-reception point that transmits the one or more aperiodic tracking reference signals,
wherein a plurality of resource sets are configured for a plurality of different aperiodic tracking reference signal configurations from a plurality of different transmission-reception points, and wherein the trigger indicates an index value that is mapped to one of the plurality of resource sets, and wherein a plurality of resource sets are configured for a plurality of different aperiodic tracking reference signal configurations from a plurality of different transmission-reception points, and wherein the trigger indicates an index value that is mapped to one of the plurality of resource sets.

35. The apparatus of claim 33, wherein at least one of the one or more aperiodic tracking reference signals is a joint tracking reference signal that is transmitted by two or more transmission-reception points.

36. The apparatus of claim 35, wherein the two or more transmission-reception points that transmit the joint tracking reference signal have one or more common radio frequency components or a common oscillator.

37. The apparatus of claim 35, wherein two or more joint tracking reference signals are transmitted by different groups of transmission-reception points, and wherein each different group of transmission-reception points is associated with a different cell identification.

38. An apparatus for wireless communication at a first transmission-reception point, comprising:
one or more processors,
memory coupled with the one or more processors; and
instructions stored in the memory and executable by the one or more processors to cause the apparatus to:
identify a set of transmission-reception points that transmit joint communications to at least a first user equipment (UE), wherein each transmission-reception point of the set of transmission-reception points has a separate cell identification;
identify a subset of the set of transmission-reception points that are to transmit periodic tracking reference signals, wherein the subset of transmission-reception points is a first subset of transmission-reception points, and wherein a second subset of the set of transmission-reception points transmits one or more aperiodic tracking reference signals or periodic tracking reference signals, and wherein the second subset of transmission-reception points is non-overlapping with the first subset of transmission-reception points; and
transmit, based at least in part on the identification of the subset, configuration information to at least the first UE that indicates the subset of transmission-reception points that are to transmit the periodic tracking reference signals.

39. The apparatus of claim 38, wherein the first transmission-reception point is not included in the subset of transmission-reception points.

40. The apparatus of claim 38, wherein the configuration information indicates that a predetermined number of the set of transmission-reception points are to be selected as the subset of transmission-reception points based at least in part on an ordering of a reference signal received power (RSRP) from each transmission-reception point of the set of transmission-reception points.

41. The apparatus of claim 38, wherein the instructions are further executable by the one or more processors to cause the apparatus to:

receive, from the first UE, a request to receive the periodic tracking reference signals from the subset of transmission-reception points.

42. The apparatus of claim 38, wherein the instructions are further executable by the one or more processors to cause the apparatus to:

transmit a trigger to the first UE that indicates to monitor for the one or more aperiodic tracking reference signals, wherein the trigger indicates the first UE is to monitor for at least one aperiodic tracking reference signal from a second transmission-reception point having a different cell identification than the first transmission-reception point.

43. The apparatus of claim 42, wherein a plurality of resource sets are configured at the first UE for a plurality of different aperiodic tracking reference signal configurations from a plurality of different transmission-reception points, and wherein the trigger indicates an index value that is mapped to one of the plurality of resource sets, and wherein at least one tracking reference signal resource set of the plurality of resource sets is associated with a group of two or more transmission-reception points.

44. The apparatus of claim 42, wherein at least one of the one or more aperiodic tracking reference signals is a joint tracking reference signal that is transmitted by two or more transmission-reception points.

45. The apparatus of claim 44, wherein the two or more transmission-reception points that transmit the joint tracking reference signal have one or more common radio frequency components or a common oscillator.

46. The apparatus of claim 44, wherein two or more joint tracking reference signals are transmitted by different groups of transmission-reception points, and wherein each different group of transmission-reception points is associated with a different cell ID.

* * * * *